(12) United States Patent
Kwak

(10) Patent No.: US 10,238,258 B2
(45) Date of Patent: Mar. 26, 2019

(54) ROBOT CLEANER AND METHOD FOR CONTROLLING THE SAME

(71) Applicant: LG ELECTRONICS INC., Seoul (KR)

(72) Inventor: Donghoon Kwak, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/521,036

(22) PCT Filed: Sep. 16, 2015

(86) PCT No.: PCT/KR2015/009737
§ 371 (c)(1),
(2) Date: Apr. 21, 2017

(87) PCT Pub. No.: WO2016/064093
PCT Pub. Date: Apr. 28, 2016

(65) Prior Publication Data
US 2017/0325647 A1   Nov. 16, 2017

(30) Foreign Application Priority Data
Oct. 24, 2014   (KR) .......................... 10-2014-0145256

(51) Int. Cl.
*A47L 9/28* (2006.01)
*A47L 9/00* (2006.01)
(Continued)

(52) U.S. Cl.
CPC ................. *A47L 9/28* (2013.01); *A47L 9/009* (2013.01); *A47L 9/2826* (2013.01);
(Continued)

(58) Field of Classification Search
CPC .......... A47L 9/28; A47L 9/009; A47L 9/2825; A47L 9/2857; A47L 9/2826;
(Continued)

(56) References Cited

U.S. PATENT DOCUMENTS 8,892,251 B1 * 11/2014 Dooley ............... A47L 11/4011
700/245
9,259,129 B2 * 2/2016 Jang ....................... A47L 9/2805
(Continued)

FOREIGN PATENT DOCUMENTS

DE    102004004505    *  8/2005    ............. A47L 11/40
EP      2 457 486          5/2012
(Continued)

OTHER PUBLICATIONS

International Search Report (Full English Text) and Written Opinion (Full English Text) dated Dec. 28, 2015 issued in Application No. PCT/KR2015/009737.
(Continued)

*Primary Examiner* — Richard M Camby
(74) *Attorney, Agent, or Firm* — Ked & Associates, LLP

(57) ABSTRACT

Disclosed is a robot cleaner including a main body forming an appearance, at least one driving wheel installed on a lower portion of the main body, a driving unit configured to drive the driving wheel according to an operation of a driving motor, a first obstacle sensor positioned on the lower portion of the main body and configured to sense an obstacle on the floor, and a control unit configured to, when the sensed obstacle on the floor has a preset pattern, limit driving of the at least one driving wheel such that the at least one driving wheel is not hindered by the preset pattern when the main body rotates on the preset pattern according to driving of the at least one driving wheel.

17 Claims, 11 Drawing Sheets

(51) Int. Cl.
  *G05D 1/00* (2006.01)
  *G05D 1/02* (2006.01)
(52) U.S. Cl.
  CPC ........... *A47L 9/2852* (2013.01); *A47L 9/2857* (2013.01); *G05D 1/0088* (2013.01); *G05D 1/021* (2013.01); *A47L 2201/04* (2013.01); *G05D 1/0242* (2013.01); *G05D 1/0255* (2013.01); *G05D 1/0257* (2013.01); *G05D 1/0259* (2013.01); *Y10S 901/01* (2013.01)
(58) Field of Classification Search
  CPC .. A47L 2201/04; G05D 1/0088; G05D 1/021; G05D 1/0242; G05D 1/0255; G05D 1/0257; G05D 1/0259; Y10S 901/01
  See application file for complete search history.

(56) References Cited

U.S. PATENT DOCUMENTS

| | | | |
|---|---|---|---|
| 2004/0083570 A1 | 5/2004 | Song et al. | |
| 2006/0190133 A1* | 8/2006 | Konandreas | A22C 17/0013 700/245 |
| 2007/0267570 A1 | 11/2007 | Park et al. | |
| 2013/0054022 A1 | 2/2013 | Jang et al. | |
| 2014/0088761 A1 | 3/2014 | Shamlian et al. | |
| 2014/0115797 A1* | 5/2014 | Duenne | G05D 1/0242 15/3 |
| 2014/0257564 A1 | 9/2014 | Sun et al. | |
| 2014/0336863 A1* | 11/2014 | So | G05D 1/0219 701/28 |
| 2015/0223659 A1* | 8/2015 | Han | A47L 11/4011 134/18 |
| 2016/0095487 A1* | 4/2016 | Koura | A47L 9/2884 15/383 |
| 2017/0071436 A1* | 3/2017 | Hofner | A47L 11/4036 |

FOREIGN PATENT DOCUMENTS

| | | |
|---|---|---|
| JP | 2009-095361 | 5/2009 |
| JP | 2014-013551 | 1/2014 |
| JP | 2014-048842 | 3/2014 |
| JP | 2014-194729 | 10/2014 |
| KR | 10-2006-0063407 | 6/2006 |
| KR | 10-2009-0096009 | 9/2009 |
| KR | 10-2011-0085499 | 7/2011 |
| WO | WO 2014/047557 | 3/2014 |

OTHER PUBLICATIONS

Japanese Office Action dated Apr. 24, 2018 issued in Application No. 2017-522021.
European Search Report dated Jun. 7, 2018 issued in Application No. 15851924.9.
Japanese Office Action dated Dec. 18, 2018 issued in Application No. 2017-522021.

* cited by examiner

|  | SECOND SENSOR(L) | FIRST SENSOR | SECOND SENSOR(R) |
|---|---|---|---|
| [1] |  | C |  |
| [2] |  | C |  |
| [3] | D | D | D |
| [4] | D | D | D |
| [5] | D | D | D |
| [6] | C | C | C |
| ⋮ | ⋮ | ⋮ | ⋮ |

ROBOT CLEANER AND METHOD FOR CONTROLLING THE SAME

CROSS-REFERENCE TO RELATED PATENT APPLICATIONS

This application is a U.S. National Stage Application under 35 U.S.C. § 371 of PCT Application No. PCT/KR2015/009737, filed Sep. 16, 2015, which claims priority to Korean Patent Application No. 10-2014-0145256, filed Oct. 24, 2014, whose entire disclosures are hereby incorporated by reference.

TECHNICAL FIELD

The present invention relates to a robot cleaner that travels without being hindered (i.e., restricted or hampered) by an obstacle of a predetermined pattern formed on the floor, and a method for controlling the same.

BACKGROUND ART

In general, robots have been developed for the industrial purposes and played a role in part of factory automation. Recently, application fields of robots have further extended to development of medical robots, aerospace robots, and the like, and even home robots have also been manufactured.

Robot cleaners are typical examples of home robots and a type of home appliance which performs cleaning by sucking dust or foreign objects nearby, while traveling in a predetermined area.

However, when a robot cleaner passes through an irregular region such as a groove (or a recess) formed in a door sill, while performing cleaning or moving, a main wheel of the robot cleaner may be hindered (caught) by the groove, and thus, the robot cleaner cannot rotate to perform normal traveling.

In order to solve the problem, Korean Patent Laid-Open Publication No. 10-2006-0063407 proposes disposition of a support wheel greater than the width of the main wheel of a robot cleaner near the main wheel.

That is, when the robot cleaner passes through an upper portion of the groove, the support wheel is supported on the upper portion of the groove, thereby preventing the main wheel of the robot cleaner from being hindered by the groove.

However, the related art robot cleaner has a problem in that the support wheel should be additionally provided to solve the problem, and thus, a technique for solving the problem is required.

DISCLOSURE OF INVENTION

Technical Problem

Therefore, an object of the present invention is to provide a robot cleaner capable of traveling or running without being hindered by an obstacle of a predetermined pattern formed on a floor, and a method for controlling the same.

Solution to Problem

According to an aspect of the present invention, there is provided a robot cleaner including: a man body forming an appearance; at least one driving wheel installed on a lower portion of the main body; a driving unit configured to drive the driving wheel according to an operation of a driving motor; a first obstacle sensor positioned on the lower portion of the main body and configured to sense an obstacle on the floor; and a control unit configured to, when the sensed obstacle on the floor has a preset pattern, limit driving of the at least one driving wheel such that the at least one driving wheel is not hindered by the preset pattern when the main body rotates on the preset pattern according to driving of the at least one driving wheel.

According to an exemplary embodiment of the present disclosure, the robot cleaner may further include: a storage unit configured to store a floor map having a size corresponding to a size of a rear surface of the robot cleaner, wherein the control unit may generate the floor map on the basis of the obstacle of the floor sensed by the first obstacle sensor, and store the generated floor map in the storage unit.

According to an exemplary embodiment of the present disclosure, the preset pattern may be a pattern in which at least one rising edge and an at least one falling edge alternate.

According to an exemplary embodiment of the present disclosure, the preset pattern may include a recess form in which the rising edge and the falling edge have a preset depth or greater and a width calculated on the basis of a distance between the rising edge and the falling edge is within a preset range or may include a step form including any one among the rising edge and the falling edge.

According to an exemplary embodiment of the present disclosure, the present pattern may include a form in which a plurality of recesses are repeated within a preset distance or a form in which a plurality of steps are repeated at a certain distance interval.

According to an exemplary embodiment of the present disclosure, the robot cleaner may further include: a second obstacle sensor positioned on at least one side of the main body to sense an obstacle in front of the main body.

According to an exemplary embodiment of the present disclosure, when the main body traveling in a first direction is positioned on the preset pattern, if an obstacle in front of the main body is sensed by the second obstacle sensor or if a cliff in front of the main body is sensed by the first obstacle sensor, the control unit may drive the at least one driving wheel such that the robot cleaner travels in a second direction opposite to the first direction.

According to an exemplary embodiment of the present disclosure, after the robot cleaner travels in the second direction and the main body or the at least one driving wheel moves out of the preset pattern, the control unit may drive the at least one driving wheel to travel along an outer side of the preset pattern.

According to another aspect of the present invention, there is provided a method for controlling a robot cleaner, including: sensing an obstacle on the floor; determining whether the sensed obstacle on the floor has a preset pattern through traveling; and when a main body of the robot cleaner is positioned on the pattern, limiting driving of the at least one driving wheel such that the at least one driving wheel is not hindered by the pattern as the main body of the robot cleaner rotates according to driving of the at least one driving wheel.

According to an exemplary embodiment of the present disclosure, the method may further include: generating a floor map on the basis of the sensed obstacle on the floor.

According to an exemplary embodiment of the present disclosure, the floor map may have a size corresponding to a size of a rear surface of the robot cleaner.

According to an exemplary embodiment of the present disclosure, the floor map may have a size corresponding to a size of a rear surface of the robot cleaner.

According to an exemplary embodiment of the present disclosure, the preset pattern may be a pattern in which at least one rising edge and an at least one falling edge alternate.

According to an exemplary embodiment of the present disclosure, the preset pattern may include a recess form in which the rising edge and the falling edge have a preset depth or greater and a width calculated on the basis of a distance between the rising edge and the falling edge is within a preset range or may include a step form including any one among the rising edge and the falling edge.

According to an exemplary embodiment of the present disclosure, the present pattern may include a form in which a plurality of recesses are repeated within a preset distance or a form in which a plurality of steps are repeated at a certain distance interval.

According to an exemplary embodiment of the present disclosure, the method may further include: sensing an obstacle or a cliff in front of the main body; and when the obstacle or the cliff is sensed, driving the at least one driving wheel to perform avoidance traveling along the outer side of the obstacle or the vicinity of the cliff.

According to an exemplary embodiment of the present disclosure, the method may further include: when the main body traveling in a first direction is positioned on the preset pattern, sensing an obstacle of a cliff in front of the main body; and when the obstacle or the cliff is sensed, driving the at least one driving wheel to travel in a second direction opposite to the first direction.

According to an exemplary embodiment of the present disclosure, the method may further include: driving the at least one driving wheel to travel along the outer side of the pattern, after the robot cleaner travels in the second direction and the main body moves out of the preset pattern.

According to another aspect of the present invention, there is provided a computer-readable recording medium recording a computer program for executing the method for controlling a robot cleaner.

Advantageous Effects of Invention

In the robot cleaner and a method for controlling the same according to exemplary embodiments of the present invention, the robot cleaner may travel without being hindered by an obstacle of a predetermined pattern formed on the floor. For example, the robot cleaner exemplary embodiments of the present invention may normally travel without being hindered to a recess portion such as a groove formed on a door sill.

BEST MODE FOR CARRYING OUT THE INVENTION

Hereinafter, the embodiments of the present invention will be described with reference to the accompanying drawings, in which like numbers refer to like elements throughout although the embodiments are different, and a description of the like elements a first embodiment will be used for those of the different embodiment. In the following description, usage of suffixes such as 'module', 'part' or 'unit' used for referring to elements is given merely to facilitate explanation of the present invention, without having any significant meaning by itself. In describing the present invention, if a detailed explanation for a related known function or construction is considered to unnecessarily divert the gist of the present invention, such explanation has been omitted but would be understood by those skilled in the art. The accompanying drawings of the present invention aim to facilitate understanding of the present invention and should not be construed as limited to the accompanying drawings. Also, the present invention is not limited to a specific disclosed form, but includes all modifications, equivalents, and substitutions without departing from the scope and spirit of the present invention.

Robot Cleaner

Figure 1:
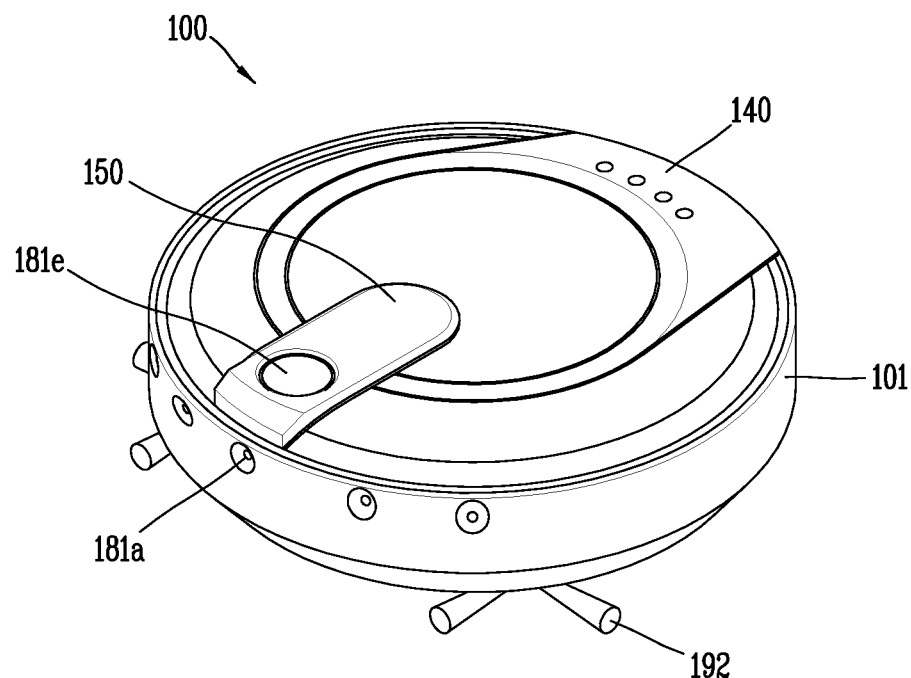
FIG. 1 is a perspective view illustrating an appearance of a robot cleaner according to an exemplary embodiment of the present disclosure.
Figure 2:
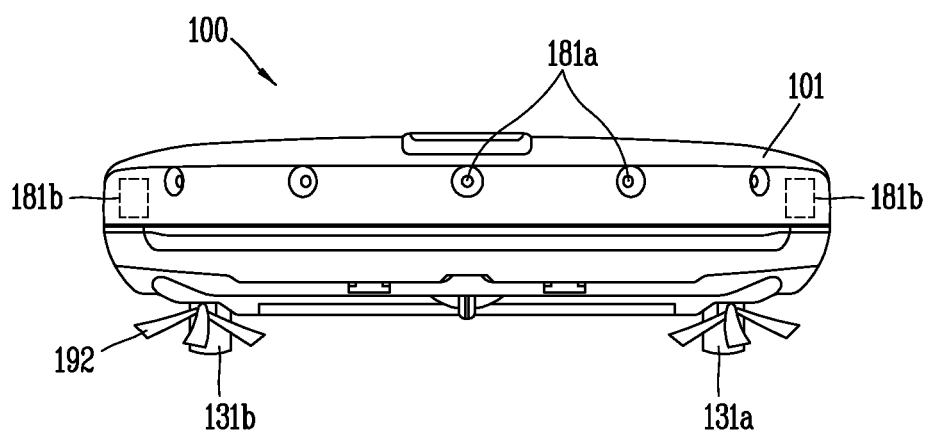
FIG. 2 is a front view illustrating an appearance of the robot cleaner according to an exemplary embodiment of the present disclosure.
Figure 3:
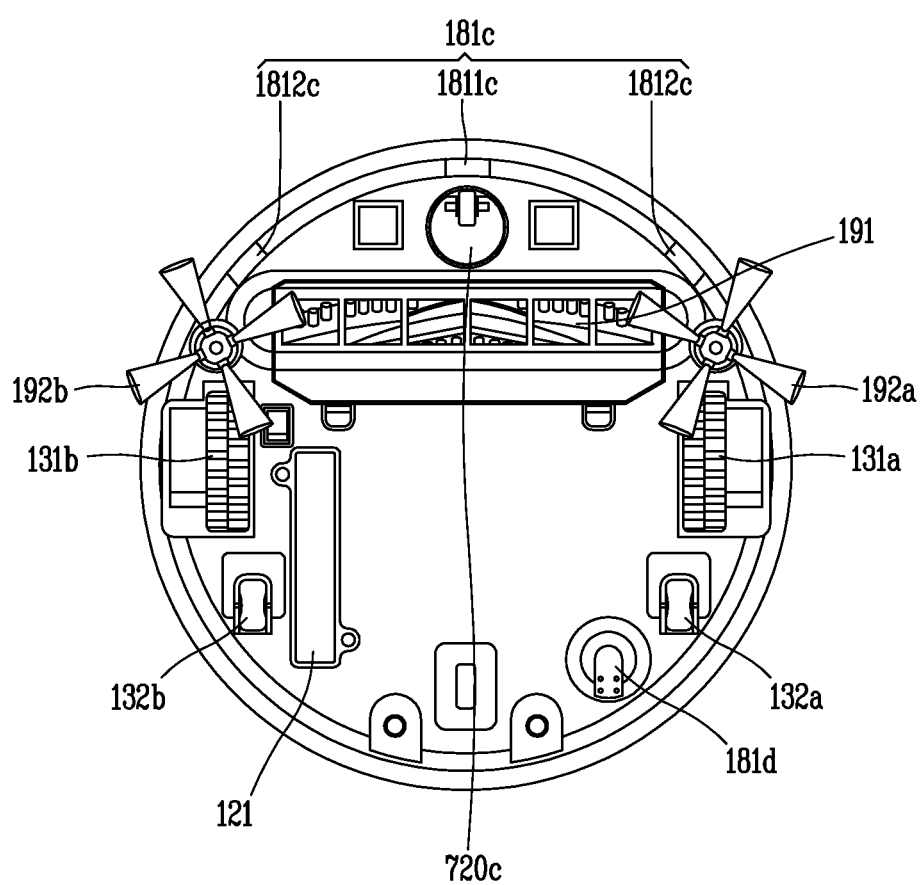
FIG. 3 is a rear view illustrating an appearance of the robot cleaner according to an exemplary embodiment of the present disclosure.
Figure 4:
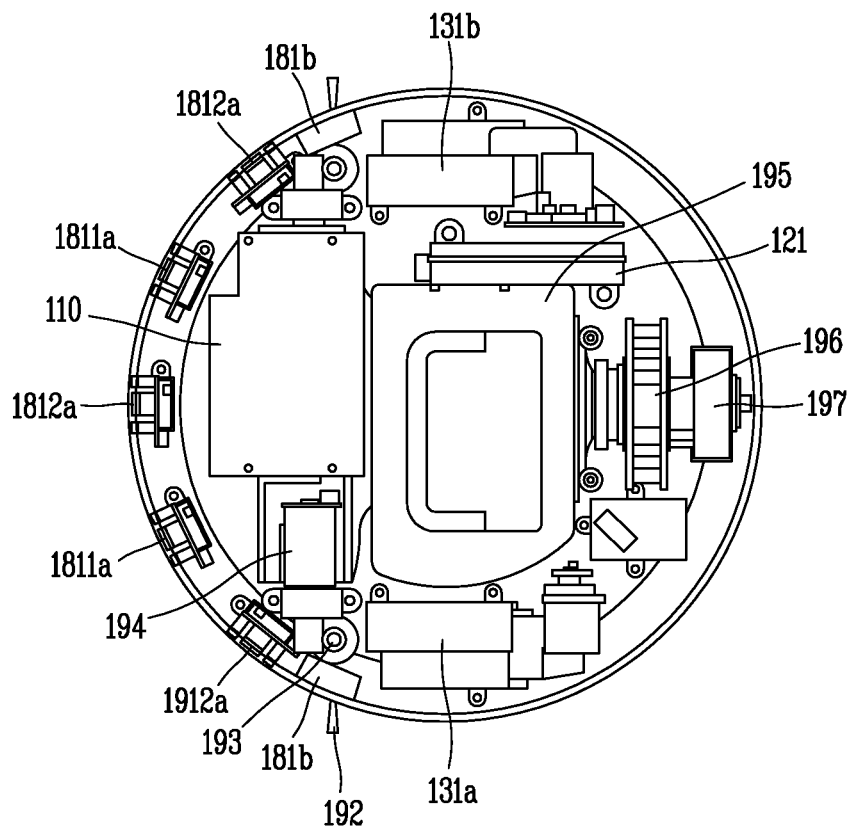
FIG. 4 is a cross-sectional view illustrating the interior of the robot cleaner according to an exemplary embodiment of the present disclosure.

FIGS. 1 through 3 are a perspective view, a front view, and a rear view illustrating an appearance of the robot cleaner according to an exemplary embodiment of the present disclosure, and FIG. 4 is a cross-sectional view illustrating the interior of the robot cleaner according to an exemplary embodiment of the present disclosure.

The robot cleaner 100 includes a cleaning unit 190 (please refer to FIG. 6) for sucking dust or foreign objects to perform cleaning.

The cleaning unit 190 includes an agitator 191 rotatably installed in a lower portion of a main body of the robot cleaner, and a side brush 192 rotating about a rotational shaft of the main body of the robot cleaner in a vertical direction to clean the corner, a nook, and the like, of a cleaning region such as a wall surface, or the like.

The agitator 191 rotates about an axis of the main body of the robot cleaner in a horizontal direction, to make dust of the floor, the carpet, and the like, float in the air. A plurality of blades are provided in a spiral direction on an outer circumferential surface of the agitator 191. A brush may be provided between the spiral blades. Since the agitator 191 and the side brush 192 rotate about different axes, the robot cleaner 100 generally needs to have a motor for driving the agitator 191 and a motor for driving the side brush 192.

Alternatively, as illustrated in FIGS. 2 and 3, the side brush 192 is disposed on both sides of the agitator 191 and an motor unit 193 (that is, a motor) is provided between the agitator 191 and the side brush 192 to transmit rotary power of the agitator 191 to the side brush 192, such that both the agitator 191 and the side brush 192 may be driven by using a single brush motor 194. In this case, as the motor unit 193, a worm and a worm gear may be used, or a belt may be used.

Figure 5:
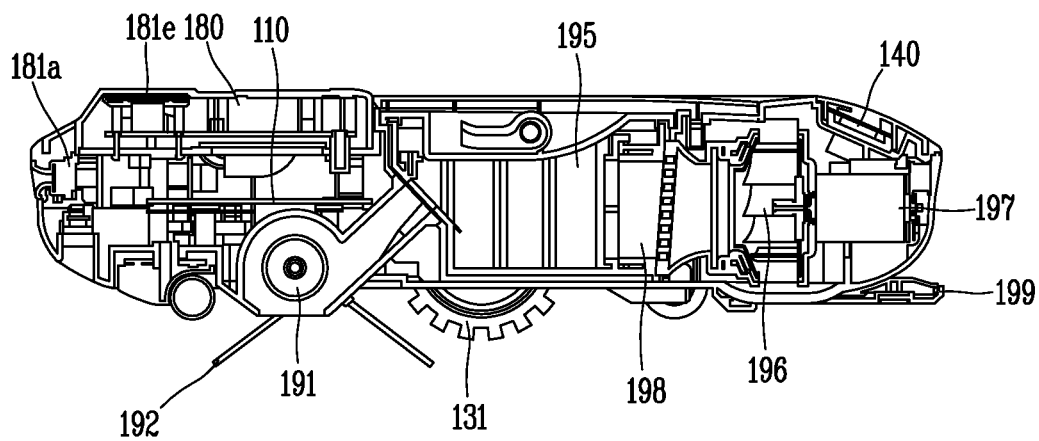
FIG. 5 is a side-sectional view illustrating the interior of the robot cleaner according to an exemplary embodiment of the present disclosure.

As illustrated in FIGS. 4 and 5, the cleaning unit 190 may include a dust container 195 storing collected dust, an intake fan 196 providing power to suck dust in a cleaning region, and an intake motor 197 rotating the intake fan 196 to intake air, thereby intaking dust or foreign objects.

The intake fan 196 includes a plurality of blades for making air flow, and a member formed to have an annular shape on an outer edge of an upper stream of the plurality of blades to connect the plurality of blades, and guiding air introduced in a direction of a central axis of the intake fan 196 to flow in a direction perpendicular to the central axis.

Here, the cleaning unit 190 may further include a filter 198 having a substantially rectangular shape and filtering out filth or dust in the air.

The filter 198 may include a first filter and a second filter as needed, and a bypass filter may be formed in a body forming the filter. The first filter and the second filter may be a mesh filter or a HEPA filter. The first filter and the second filter may be formed of either non-woven cloth or a paper filter, or both the non-woven cloth and the paper filter may be used together.

A control unit 110 may detect a state of the dust container 195. In detail, the control unit 110 may detect an amount of dust collected in the dust container 195 and detect whether the dust container 195 is installed in the robot cleaner 100 or whether the dust container 195 has been separated from the robot cleaner 100. In this case, the control unit may sense a degree to which dust is collected in the dust container by inserting a piezoelectric sensor, or the like, into the dust container. Also, an installation state of the dust container may be sensed in various manners. For example, as a sensor for sensing whether the dust container is installed, a microswitch installed to be turned on and off on a lower surface of a recess in which the dust container is installed, a magnetic sensor using a magnetic field of a magnet, an optical sensor including a light emitting unit and a light receiving unit, and receiving light, and the like, may be used. The magnetic sensor may include a sealing member formed of a synthetic rubber material in portion where magnet is bonded.

Also, the cleaning unit 190 may further include a rag plate 199 detachably attached to a lower portion of the main body of the robot cleaner. The rag plate 199 may include a detachably attached rag, and the user may separate the rag to wash or replace it. The rag may be installed in the rag plate in various manners, and may be attached to the rag plate 199 by using a patch called Velcro. For example, the rag plate 199 is installed in the main body of the robot cleaner 100 by magnetism. The rag plate 199 includes a first magnet and the main body of the cleaner may include a metal member or a second magnet corresponding to the first magnet. When the rag plate 199 is normally positioned on the bottom of the main body of the robot cleaner 100, the rag plate 199 is fixed to the main body of the robot cleaner 100 by the first magnet and a metal member or the first magnet and the second magnet.

The robot cleaner 100 may further include a sensor sensing whether the rag plate 199 is installed. For example, the sensor may be a reed switch operated by magnetism, or may be a hall sensor. For example, the reed switch may be provided in the main body of the robot cleaner 100, and when the rag plate 199 is coupled to the main body of the robot cleaner 100, the reed switch may operate to output an installation signal to the control unit 110.

Meanwhile, as illustrated in FIG. 2, the robot cleaner 100 may include main wheels 131a and 131b provided on the left and right sides of a lower portion thereof to allow the main body of the robot cleaner 100 to move. A driving unit 130 may be connected to the left and right main wheels 131a and 131b and include a motor (for example, a wheel motor) for rotating the main wheels 131a and 131b. By rotating the motor, the main body of the robot cleaner 100 may be rotated or moved.

Here, a plurality of wheel motors may be provided to be connected to the main wheels 131a and 131b, and here, the plurality of wheel motors may independently operate such that the main wheels 131a and 131b may be individually controlled.

Also, the robot cleaner 100 may further include one or more auxiliary wheels 132a, 132b, and 132c provided on the rear surface thereof. The auxiliary wheels 132a, 132b, and 132c may support the main body of the robot cleaner 100 and minimizes frictional contact between a lower surface of the main body of the robot cleaner 100 and a floor (the surface to be cleaned) to assist the robot cleaner 100 to smoothly move.

Also, a handle may be installed in an edge of a lower portion of the main body of the robot cleaner 100, for example, on both sides of the main wheels 131a and 131b.

Figure 6:
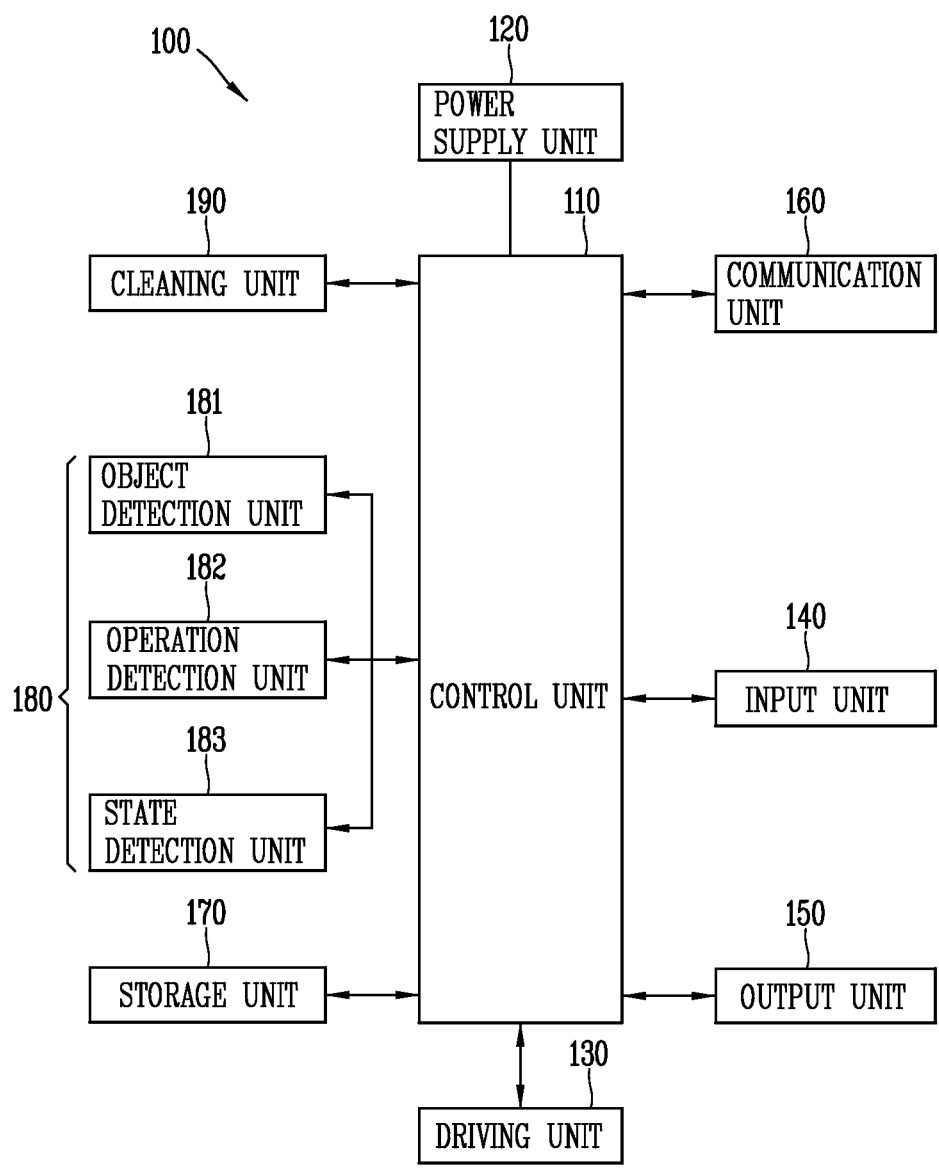
FIG. 6 is a block diagram illustrating a configuration of the robot cleaner according to an exemplary embodiment of the present disclosure.

FIG. 6 is a block diagram illustrating a configuration of the robot cleaner according to an exemplary embodiment of the present disclosure.

As illustrated in FIG. 6, the robot cleaner 100 according to an exemplary embodiment of the present disclosure may include a control unit 110, a power supply unit 120, a driving unit 130, an input unit 140, an output unit 150, a communication unit 160, a storage unit 170, a detection unit 180, and a cleaning unit 190. Here, the robot cleaner 100 may include at least one of these elements or combinations thereof.

Here, the components illustrated in FIG. 6 are not essential and a robot cleaner including greater or fewer components may be implemented. Hereinafter, the components will be described.

First, the power supply unit 120 includes a battery 121 that may be charged by external commercial power and supply power to the interior of the robot cleaner 100. The power supply unit 120 may supply driving power to each of the components included in the robot cleaner to provide operation power required for the robot cleaner 100 to travel (or move or run) or perform cleaning.

Figures 7, 8:
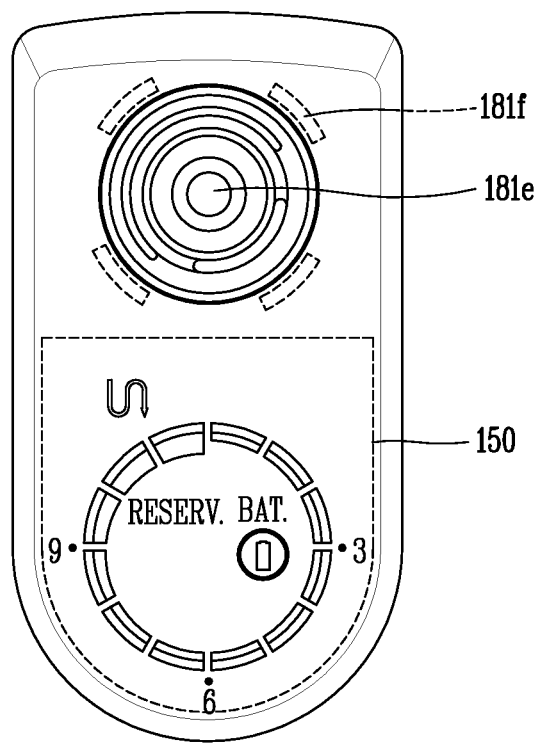
FIG. 7 is an enlarge view illustrating an output unit of the robot cleaner according to an exemplary embodiment of the present disclosure.
FIG. 8 is a view illustrating an example of a floor map generated by the robot cleaner according to an exemplary embodiment of the present disclosure.

Here, the control unit 110 detects a remaining capacity of power of the battery 121, and when the remaining capacity of power is insufficient, the control unit 110 controls the robot cleaner 100 to a recharging base connected to an external commercial power, and the battery 121 may be charged upon receiving a charge current from the recharging base. The battery 121 may be connected to a battery sensing unit and a remaining battery capacity and a charging state thereof may be transmitted to the control unit 110. As illustrated in FIG. 8, the output unit 150 may display a remaining battery capacity on a screen by the control unit 110.

The battery 121 may be positioned in a lower portion of the center of the robot cleaner 100, and as illustrated in FIG. 4, the battery 121 may be positioned on one of left and right side such that the dust container 195 is positioned in the lowermost portion of the main body of the robot cleaner 100. In the latter case, the robot cleaner 100 may further include a balance weight (or a counter weight) in order to resolve weight unbalance of the battery 121.

Meanwhile, since the driving unit 130 includes a motor and drives the motor, the driving unit 130 may rotate the left and right main wheels 131*a* and 131*b* in both directions to rotate or move the main body of the robot cleaner 100. Details thereof are the same as those described above, and thus, here, a detailed description thereof will be omitted.

Meanwhile, the input unit 140 receives various control commands with respect to the robot cleaner 100 from a user. The input unit 140 may include one or more buttons. For example, the input unit 140 may include an OK button, a setting button, and the like. The OK button may be a button for receiving a command for ascertaining sensing information, obstacle information, position information, a cleaning region, or a cleaning map, and the setting button may be a button for receiving a command for setting the foregoing information from the user.

Also, the input unit 140 may include an input resetting button for canceling a previous user input and receiving a user input again, a deletion button for deleting a preset user input, a cleaning start button, a cleaning stop button, a reservation button for setting or deleting reservation information, a button for setting or changing a cleaning mode, a button for receiving a command for returning to the recharging base, and the like.

Also, as illustrated in FIGS. 1 and 5, the input unit 140 may be a hard key, a soft key, a touch pad, and the like, and may be installed in an upper portion of the robot cleaner 100. Also, the input unit 140 may have a form of a touch screen together with the output unit 150.

Meanwhile, as illustrated in FIG. 1, the output unit 150 may be installed in an upper portion of the robot cleaner 100. Of course, the installation position and installation form may vary. For example, as illustrated in FIG. 7, the output unit 150 may display a cleaning scheme or a traveling scheme such as reservation information, a battery state, intensive cleaning, space expansion, zigzag operation, and the like, on a screen.

Also, the output unit 150 may output internal state information of the robot cleaner 100 detected by the detection unit 180, for example, the current state of each component included in the robot cleaner and the current cleaning state. Also, the output unit 150 may display external state information detected by the detection unit 180, for example, obstacle information, position information, a cleaning region, a cleaning map, and the like, on the screen. The output unit 150 may be formed as any one device among a light emitting diode (LED), a liquid crystal display (LCD), a plasma display panel (PDP), and an organic light emitting diode (OLED).

The output unit 150 may further include a sound output unit acoustically outputting an operation process or an operation result of the robot cleaner 100 performed by the control unit 110. For example, the output unit 150 may output a warning sound (or an alarm sound) to the outside according to a warning signal generated by the control unit 110.

Here, the sound output unit may be a unit for outputting a sound, such as a beeper, a speaker, and the like, and the output unit 150 may output a sound through the sound output unit using audio data or message data having a predetermined pattern stored in the storage unit 170.

Meanwhile, the communication unit 160 is connected to an external terminal device through one of communication schemes, which can be currently available, namely, among a wired communication scheme, a wireless communication scheme, and a satellite communication scheme, to transmit and receive a signal and data. The communication unit 160 may receive a control signal from a terminal device. Accordingly, the control unit 110 may perform a command such as map creation, traveling within a cleaning region, performing cleaning, and the like, according to the control signal received through the communication unit 160. For example, the control unit 110 may receive a control command, which can be received from the user, through the communication unit 160, and the control unit 110 may perform the received control command. Also, the communication unit 160 may transmit state information, obstacle information, position information, image information, a cleaning map, and the like, of the robot cleaner 100 to the terminal device. For example, the communication unit 160 may transmit various types of information, which can be output through the output unit 150, to the terminal device. Here, the communication unit 160 may perform communication with the terminal device through any one of short-range communication schemes (or near-field communication schemes) such as radio frequency (RF) communication, Bluetooth™, infrared data association (IrDA), wireless local area network (WLAN), ZigBee™, and the like. For example, in a case in which the terminal device is a mobile terminal (for example, a smartphone), the robot cleaner 100 may include a communication unit 160 according to a communication scheme available for the mobile terminal.

Meanwhile, the storage unit 170 stores a control program for controlling or driving the robot cleaner 100. The storage unit 170 may store audio information, image information, obstacle information, position information, a cleaning region, a cleaning map, and the like. Also, the storage unit 170 may store a cleaning scheme, a traveling method, and the like.

As the storage unit 170, a nonvolatile memory is mainly used. Here, the nonvolatile memory (NVM, or NVRAM) is a storage device capable of maintaining stored information even without power supply, which may be, for example, a ROM, a flash memory, a magnetic computer storage device (e.g., a hard disk, a diskette drive, a magnetic tape, etc.), an optical drive, a magnetic RAM, a PRAM, and the like.

Meanwhile, as illustrated in FIG. 6, the detection unit 180 may include at least one among an object detection unit 181 for detecting an external object, an operation detection unit 182 for detecting an operation of the robot cleaner 100, and a state detection unit 183 for detecting a state of units constituting the robot cleaner 100.

The object detection unit 181 may include at least one among an external signal sensor, a front sensor, a cliff sensor, a lower camera sensor, and an upper camera sensor.

The external signal sensor may sense an external signal of the robot cleaner 100. The external signal sensor may be, for example, an infrared sensor, an ultrasonic sensor, an RF sensor, and the like.

The robot cleaner 100 may receive a guide signal generated by the recharging base by using the external signal sensor and check a position and direction of the recharging base. Here, the recharging base may generate a guide signal indicating a direction and a distance such that the robot cleaner 100 may be returned. That is, the robot cleaner 100 may receive a signal transmitted from the recharging base, determine the current position, set a movement direction, and may be returned to the recharging base.

Also, the robot cleaner 100 may sense a signal generated by a remote control device such as a remote controller, a terminal, and the like, by using the external signal sensor.

The external signal sensor may be provided on one side within the robot cleaner 100 or outside of the robot cleaner 100. For example, an infrared sensor 181*b* may be installed within the robot cleaner 100 or below the output unit 150, or as illustrated in FIG. 7, the infrared sensor 181*f* may be installed in the vicinity of the upper camera sensor 181*e*.

Meanwhile, the front sensor may be installed at a predetermined interval on a front side of the robot cleaner 100, specifically, along an outer circumferential surface of the side of the robot cleaner 100. The front sensor is positioned on at least one side of the robot cleaner 100 to sense an obstacle in front of the main body of the robot cleaner 100. The front sensor will be mixedly used together with a term of a "second obstacle sensor" among terms used in the present disclosure.

The front sensor may sense an object, in particular, an obstacle, present in a direction in which the robot cleaner 100 moves, and transmit detection information to the control unit 110. That is, the front sensor may sense a protrusion present in a movement path of the robot cleaner 100, furnishings, furniture, a wall surface, a wall corner, and the like, in a house, and transmit corresponding information to the control unit 110.

The front sensor may be, for example, an infrared sensor, an ultrasonic sensor, an RF sensor, a geomagnetic sensor, and the like, and the robot cleaner 100 may use a type of sensor or two or more types of sensors together as the front sensor.

For example, in general, the ultrasonic sensor 181*a* may be mainly used to sense an obstacle in a remote area. The ultrasonic sensor 181*a* may include a transmission unit 1811*a* and a reception unit 1812*a*. The ultrasonic sensor 181*a* may determine whether an obstacle is present according to whether an ultrasonic wave radiated through the transmission unit 1811*a* is reflected by an obstacle, or the like, and received by the reception unit 1812, and calculate a distance to the obstacle by using an ultrasonic wave radiation time and an ultrasonic wave reception time.

As illustrated in FIG. 1 or 2, a plurality of ultrasonic sensors 181*a* (for example, five ultrasonic sensors) may be installed on an outer circumferential surface of a front side of the robot cleaner 100. Here, preferably, the transmission units 1811*a* and the reception units 1812*a* of the ultrasonic sensors 181*a* may be installed alternately on the front side of the robot cleaner 100.

Namely, the transmission units 1811*a* may be disposed to be spaced apart from the center of the front side of the main body of the robot cleaner 100, and in this case, one or two or more transmission units 1811*a* may be disposed between reception units 1812*a* to form a reception region of an ultrasonic signal reflected from the obstacle, or the like. Due to this disposition, a reception region may be expanded, while reducing the number of sensors. A transmission angle of ultrasonic waves may be maintained at an angle of a range which does not affect other signals to prevent a crosstalk phenomenon. Also, reception sensitivity of the reception units 1812*a* may be set to be different.

Also, the ultrasonic sensors 181*a* may be installed upwardly at a predetermined angle such that ultrasonic waves generated by the ultrasonic sensors are output upwardly, and in this case, in order to prevent the ultrasonic waves from being radiated downwardly, a predetermined blocking member may be further provided.

Meanwhile, as mentioned above, two or more types of sensors may be used as the front sensors, and thus, one or more types of sensor among an infrared sensor, an ultrasonic sensor, and an RF sensor may be used as the front sensors.

For example, as illustrated in FIGS. 1 and 2, the front sensor may include an infrared sensor 181*b* as a different type of sensor, in addition to the ultrasonic sensor 181*a*.

As illustrated in FIGS. 2 and 4, the infrared sensor 181*b* may be installed on an outer circumferential surface of the robot cleaner 100 together with the ultrasonic sensor 181*a*. The infrared sensor 181*b* may also sense an obstacle present in front of or by the side of the robot cleaner 100 and transmits corresponding obstacle information to the control unit 110. That is, the infrared sensor 181*b* may sense a protrusion present in a movement path of the robot cleaner 100, furnishings, furniture, a wall surface, a wall corner, and the like, in a house, and transmit corresponding information to the control unit 110. Thus, the robot cleaner 100 may move in a cleaning area without colliding with an obstacle.

Meanwhile, as the cliff sensor, various types of optical sensors may be use, and the cliff sensor may sense an obstacle of the floor supporting the main body of the robot cleaner 100.

That is, the cliff sensor may be installed on a rear surface of the robot cleaner 100 and may be installed in different regions depending on a type of a robot cleaner. The cliff sensor may be positioned on a rear surface of the robot cleaner 100 to sense an obstacle on the floor. The cliff sensor will be mixedly used together with a term a "first obstacle sensor" among terms used in the present disclosure.

The cliff sensor may be, for example, an infrared sensor including a light emitting unit and a light receiving unit, an ultrasonic sensor, an RF signal sensor, a position sensitive detector (PSD) sensor, and the like, like the obstacle sensor.

As illustrated in FIG. 3, for example, any one of cliff sensors 181*c* may be installed on the front side of the robot cleaner 100, and the other two cliff sensors may be installed on a relatively rear side.

The cliff sensors 181c illustrated in FIG. 3 may be disposed as follows. For example, for the purposes of description, the cliff sensor installed on the front side of the robot cleaner 100 will be referred to as a first sensor 1811c and the sensors installed on the relatively rear side will be referred to as second sensors 1812c. In general, the first sensor 1811c and the second sensors 1812c may be the same type of sensors, for example, PSD sensors, or the first sensor 1811c and the second sensors 1812c may be configured as different types of sensors.

Hereinafter, in the exemplary embodiments of the present disclosure, it is assumed that the cliff sensors are PSD sensors. However, this is to facilitate the description of the present disclosure without intending to limit the scope of the present invention.

Each of the PSD sensors detects a distance to an object of light by using a single p-n junction using semiconductor surface resistance. The PSD sensor includes a one-dimensional PSD sensor detecting light in only one axial direction and a two-dimensional PSD sensor detecting a light position on a plane. Both PSD sensors may have a pin photo diode structure. The PSD sensor is a type of infrared sensor which transmits an infrared ray to an obstacle and measures an angle between the infrared ray transmitted to the obstacle an infrared ray returned after being reflected from the obstacle, thus measuring a distance therebetween.

The PSD sensor includes a light emitting unit emitting infrared light to an obstacle and a light receiving unit receiving infrared light returned after being reflected from the obstacle. In general, the PSD sensor is formed as a module. In a case in which an obstacle is sensed by using the PSD sensor, a stable measurement value can be obtained regardless of difference in reflectivity or color of an obstacle.

The control unit 110 may measure an angle between an infrared light emitting signal irradiated by the first sensor 1811c toward the floor and a reflection signal received after being reflected from the obstacle to sense a cliff, and analyze a depth thereof.

Meanwhile, the control unit 110 may determine whether the robot cleaner 100 may be able to pass through the cliff according to states (height/depth) of the cliff sensed by using the first sensor 1811c and the second sensors 1812c. For example, the control unit 110 may determine whether a cliff is present and a depth of the cliff through the first sensor 1181c and only when a reflection signal is sensed by the second sensors 1812c, the control unit 110 allows the robot cleaner 100 to pass through the cliff.

In another example, the control unit 110 may determine whether the robot cleaner 100 is lifted according to a combination of sensing results of the first sensor 1811c and the second sensors 1812c.

Meanwhile, as illustrated in FIG. 3, the lower camera sensor 181d may be provided on a rear surface of the robot cleaner 100 and obtain image information regarding a lower side, namely, the floor (or a surface to be cleaned). The lower camera sensor 181d may also be called an optical flow sensor. The lower camera sensor 181d may convert an image of the lower side input through an image sensor provided therein to generate a predetermined format of image data. The generated image data may be stored in the storage unit 170.

The lower camera sensor 181d may further include a lens (not shown) and a lens adjusting unit (not shown) for adjusting the lens (not shown). As the lens, a pan focus type lens having a short focal length and a deep depth is preferably used. The lens adjusting unit may include a predetermined motor and a moving unit to move the lens forwardly and backwardly and adjusts a position of the lens by using the motor and the moving unit.

Also, one or more light sources may be installed to be adjacent to an image sensor. One or more light sources irradiate light to a predetermined region of the floor captured by the image sensor. Namely, in a case in which the robot cleaner 100 moves a cleaning region along the floor, when the floor is smooth, a predetermined distance is maintained between the image sensor and the floor. On the other hand, in a case in which the robot cleaner 100 moves on the floor which is uneven, the image sensor may become spaced away from the floor by a predetermined distance or greater due to depressions and protrusions and an obstacle of the floor. In this case, the one or more light sources may be controlled by the control unit 110 such that an amount of irradiated light can be adjusted. The light sources may be a light emitting device, for example, a light emitting diode (LED), or the like, whose amount of light can be adjusted.

The control unit 110 may detect a position of the robot cleaner 100 regardless of whether the robot cleaner 100 slides due to various factors, by using the lower camera sensor 181d. The control unit 110 may compare and analyze image data captured by the lower camera sensor 181d over time to calculate a movement distance and a movement direction, and calculate a position of the robot cleaner 100 on the basis of the calculated movement distance and the movement direction. By using the image information regarding the lower side of the robot cleaner 100 using the lower camera sensor 181d, the control unit 110 may perform correction resistant to sliding with respect to a position of the robot cleaner 100 calculated by other means.

Meanwhile, as illustrated in FIGS. 1 and 5, the upper camera sensor 181e may be installed to be oriented upwardly or forwardly of the robot cleaner 100 to capture an image of a surrounding area of the robot cleaner 100. In a case in which the robot cleaner 100 includes a plurality of upper camera sensors, the camera sensors may be formed on an upper portion or on a lateral surface of the robot cleaner 100 at a predetermined distance or at a predetermined angle.

The upper camera sensor 181e may include a lens for adjusting a focal point of a subject, an adjusting unit for adjusting the camera sensor, and a lens adjusting unit for adjusting the lens. As the lens, a lens having a wide angle of view may be used such that every surrounding region, for example, the entire region of the ceiling, may be imaged even in a predetermined position. For example, a lens having an angle equal to or greater than a predetermined angle of view, for example, equal to or greater than 160 degrees, may be used.

The control unit 110 may recognize a position of the robot cleaner 100 by using image data captured by the upper camera sensor 181e, and create a cleaning map regarding the cleaning region. The control unit 110 may precisely recognize a position by using image data through an acceleration sensor, a gyro sensor, a wheel sensor, and the lower camera sensor and image data obtained by the upper camera sensor.

Also, the control unit 110 may precisely generate a cleaning map by using the obstacle information detected by the front sensor, the obstacle sensor, and the like, and the position recognized by the upper camera sensor 181e.

Meanwhile, the operation detection unit 182 may include one or more of an acceleration sensor, a gyro sensor, and a wheel sensor, and detect an operation of the robot cleaner 100.

The acceleration sensor may detect a change in speed of the robot cleaner 100, for example, a change in a movement speed due to start, stop, a change in direction, collision with an object, and the like. The acceleration sensor may be attached to a position adjacent to the main wheel or an auxiliary wheel to detect sliding or idle rotation of the wheel. In this case, a speed is calculated by using the acceleration detected by the acceleration sensor, and a position of the robot cleaner 100 may be checked and corrected by comparing the calculated speed and a reference aped. However, in an exemplary embodiment of the present disclosure, the acceleration sensor is installed in the control unit 110 to sense a change in a speed of the robot cleaner 100 itself made in a cleaning mode and a traveling mode. That is the acceleration sensor may detect impulse according to a change in speed, and outputs a voltage value corresponding thereto. Thus, the acceleration sensor may serve as an electronic bumper.

Also, the gyro sensor senses a rotation direction and detects a rotation angle when the robot cleaner 100 moves according to an operation mode. The gyro sensor detects an angular velocity of the robot cleaner 100 and outputs a voltage value in proportion to the angular velocity. The control unit 110 may calculate a rotation direction and a rotation angle by using a voltage value output from the gyro sensor.

Also, the wheel sensor may be connected to main wheels on the left and right side to sense the revolution per minute (RPM) of each of the main wheels. The wheel sensor may be a rotary encoder. The rotary encoder may sense the RPM of each of the main wheels on the left and right side and output the same when the robot cleaner 100 moves in a traveling mode or a cleaning mode. The control unit 110 may calculate a rotation speed of the left and right wheels by using the RPM. Also, the control unit 110 may calculate a rotation angle of the robot cleaner 100 by using a difference in the RPMs of the left and right wheels sensed by the wheel sensor.

Meanwhile, the state detection unit 183 includes sensors for detecting a state of each unit, such as sensors for detecting a state of the main wheels, a state of a wheel drop switch, a state of an intake motor, a state of an agitator, and the like. Also, the state detection unit 183 may include a sensor for detecting a state of the dust container, a state of the battery, a state of the rag plate, and the like. Before a cleaning command is performed or while a battery of the robot cleaner is being charged, the control unit 110 may determine one of a state of the dust container, a state of the rag plate, and a state of the battery, or a combination of the states, and output the determination result through the output unit 150.

Meanwhile, in the robot cleaner 100 according to an exemplary embodiment of the present disclosure, by using the first obstacle sensor 181c, the control unit may sense a shape of the floor (or the surface to be cleaned) by an obstacle sensed by the first obstacle sensor 181c.

In the robot cleaner 100 according to an exemplary embodiment of the present disclosure, the control unit 110 may generate a floor map on the basis of an obstacle sensed by the first obstacle sensor 181c.

The floor map may include information regarding a distance to an obstacle on the floor from the first obstacle sensor 181c (for example, a PSD sensor), and may be generated by the control unit 110.

FIG. 8 is a view illustrating an example of a floor map generated by the robot cleaner according to an exemplary embodiment of the present disclosure. The floor map may include a shape of the floor (or the surface to be cleaned), and according to an exemplary embodiment of the present disclosure, the floor map may be a matrix in which terms having certain values are arranged in n columns and m rows.

When the PSD sensors include two second sensors 1812c disposed on the left and right side of the rear surface of the main body of the robot cleaner 100 and the first sensor 1811c disposed between the two second sensors 1812c, a floor map may have 3 rows corresponding to the number of the PSD sensors.

Also, the PSD sensors may obtain information regarding an obstacle on the floor at predetermined intervals as the robot cleaner 100 travels, and stores the information regarding the obstacle in the storage unit 170. Here, the control unit 110 may generate a floor map having m rows on the basis of a size of the storage unit 170, a traveling speed of the robot cleaner 100, and the like, and stores the floor map having a size corresponding to the size of the rear surface of the robot cleaner 100.

As described above, each term of the arrangement indicating the floor map denotes information regarding a distance from the PSD sensors to the obstacle on the floor. For example, each term of the arrangement denoting the floor map may have a value corresponding to a distance from the robot cleaner 100 to the bottom obstacle. That is, the distance from the robot cleaner 100 to the obstacle on the floor may have a value corresponding to any one among first to nth ranges. For example, the first range may be equal to or greater than 0 and smaller than 5, the second range may be equal to or greater than 5 mm and smaller than 10 mm, and the third range may be equal to or greater than 10 mm and smaller than 15 mm, and a third range. Alphabets may correspond to the ranges in ascending order. For example, in a case in which a distance from the robot cleaner 100 to the obstacle on the floor is 10 mm, "C" corresponding to the third range may be matched to the distance, and in a case in which a distance from the robot cleaner 100 to the obstacle on the floor is 15 mm, "D" corresponding to the third range may be matched to the distance (please refer to FIG. 8). Here, the range may be changed according to resolution of the PSD sensor.

In another example, each term of the floor map may have a corresponding value according to whether an obstacle on the floor has a rising edge or a falling edge according to traveling of the robot cleaner 100. For example, in a case in which the obstacle on the floor has a rising edge according to traveling of the robot cleaner 100, each term of the floor map may have a value 1, or in a case in which the obstacle on the floor has a falling edge, each term of the floor map may have a value 2. In a case in which there is no edge, each term of the floor map may have a value 0.

Here, when the control unit 110 generates an initial ground map, as illustrated in FIG. 8, since the second sensors 1812c are positioned on the rear side, relative to the first sensor 1811c, with respect to the traveling direction of the robot cleaner 100, and thus, information regarding first and second rows, among the information obtained from the second sensors 1812c of the floor map may not be obtained.

Meanwhile, in the robot cleaner 100 according to an exemplary embodiment of the present disclosure, in order to sense a shape of the floor, the first obstacle sensor 181c may be used as described above. Alternatively, according to an exemplary embodiment of the present disclosure, a shape of the floor may be sensed on the basis of image information obtained by using the lower camera sensor 181d, and a floor map may be generated on the basis of the image information. That is, by using the image information, a floor map may be generated on the basis of the information of the calculated distance to an obstacle. Details thereof are similar to the contents of detecting an obstacle on the floor using the first obstacle sensor 181*c*, and thus, a detailed description thereof will be omitted.

In a case in which an obstacle sensed by the first obstacle sensor 181*c* on the floor (or the surface to be cleaned) has a preset pattern, when the body of the robot cleaner 100 on the preset pattern rotates according to driving of the driving wheels, the control unit 110 may limit driving of the driving wheels such that the driving wheels may not be hindered to the pattern.

Figure 9A:
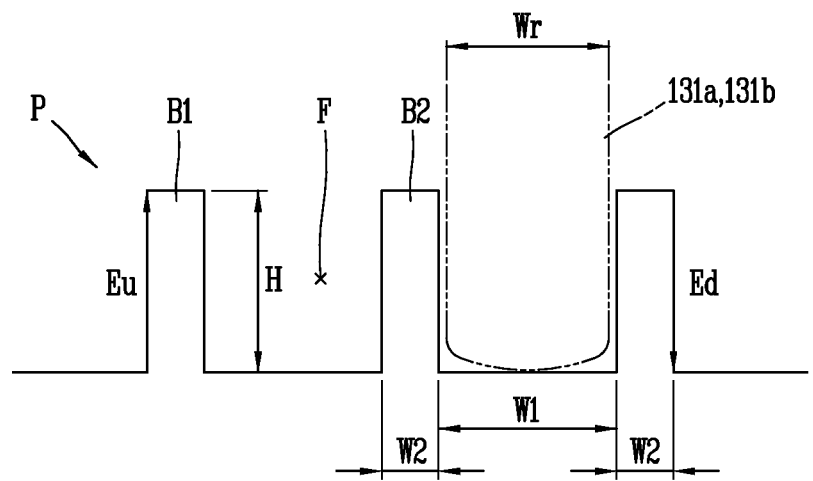
FIG. 9A is a view illustrating a vertical-cross section of an example of a pattern formed on the floor of a cleaning region.

Here, as illustrated in FIG. 9A, the preset pattern is formed on the floor (or the surface to be cleaned) and may be a pattern in which at least one rising edge and at least one falling edge alternate, and in this case, any one falling edge and any one rising edge may be spaced apart from one another by a predetermined interval in a recess form.

Figure 9B:
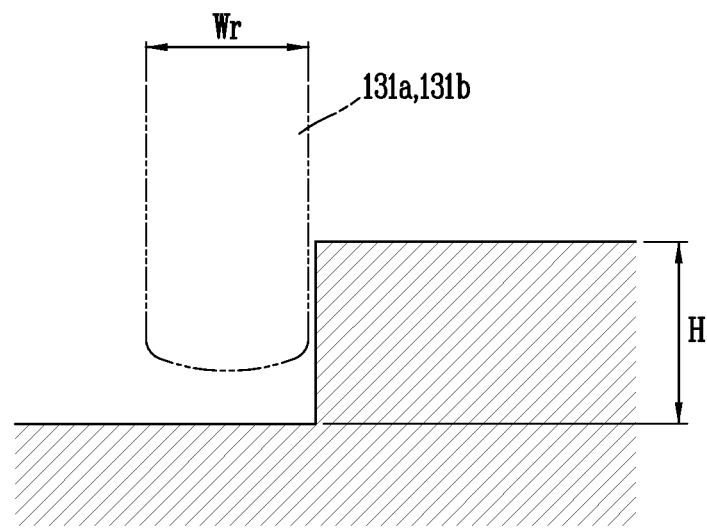
FIG. 9B is a view illustrating a vertical-cross section of another example of a pattern formed on the floor of a cleaning region.

Alternatively, as illustrated in FIG. 9B, the preset pattern may have a step form including at least one rising edge or at least one falling edge.

Hereinafter, the preset pattern including a recess form will be described.

In detail, as illustrated in FIG. 9A, the preset pattern P may be a pattern in which at least one rising edge Eu and at least one falling edge Ed alternate.

Here, any one protrusion B1 formed by the rising edge Eu and the other protrusion B2 adjacent to the one protrusion B1 may be spaced apart from one another on the floor of the cleaning region. That is, a recess F formed by the any one falling edge Ed and anyone rising edge Eu may have a predetermined width W1. Here, the width of the recess F may range from 10 mm to 50 mm.

Also, the recess F may have a predetermined height H, and in the preset pattern having a recess form, the rising edge and/or the falling edge may be equal to or greater than the preset depth. Here, the height H of the preset pattern may be 15 mm or greater.

That is, at least one recess F having the predetermined width W1 and the predetermined height H may be formed in the preset pattern.

As illustrated in FIG. 9A, in a case in which at least one driving wheel (for example, the main wheels 131*a* and 131*b*) is inserted into the recess F formed to be greater than the predetermined width W1 and the predetermined height H when the robot cleaner 100 is driving, rotation or movement of the robot cleaner 100 may be limited.

That is, the predetermined width W1 may be greater than a width Wr of the main wheels 131*a* and 131*b* (in other words, a thickness of the main wheels 131*a* and 131*b*) and may be smaller than a width in which the main wheels 131*a* and 131*b* are rotatable, and thus, the main wheels of the robot cleaner 100 may be limited in rotation in a horizontal direction.

Also, the predetermined height H of the recess F may be higher than a height to which the main wheels 131*a* and 131*b* protrude from the main body of the robot cleaner 100, and thus, the main wheels of the robot cleaner 100 may be limited in rotation with respect to a driving axis, limiting movement of the robot cleaner 100.

Meanwhile, the recess F may be repeatedly formed within a preset distance W2. That is, a plurality of recesses F may be formed within a distance W2 narrower than the width Wr of the main wheels 131*a* and 131*b* of the robot cleaner 100.

In a case in which the main wheels 131*a* and 131*b* of the robot cleaner 100 are positioned on the ridge including the recess F and the distance W2 between the plurality of recesses F is narrower than the width Wr of the main wheels 131*a* and 131*b*, the main wheels 131*a* and 131*b* of the robot cleaner 100 may slide when the robot cleaner 100 rotates and/or moves. In this case, the distance W2 between the plurality of recesses F having a preset pattern determined by the control unit 110 may be equal to or smaller than 50 mm.

As described above, the preset pattern may include a shape in which a plurality of steps are repeated at certain distances, and the step illustrated in FIG. 9B is no different.

Figure 9C:
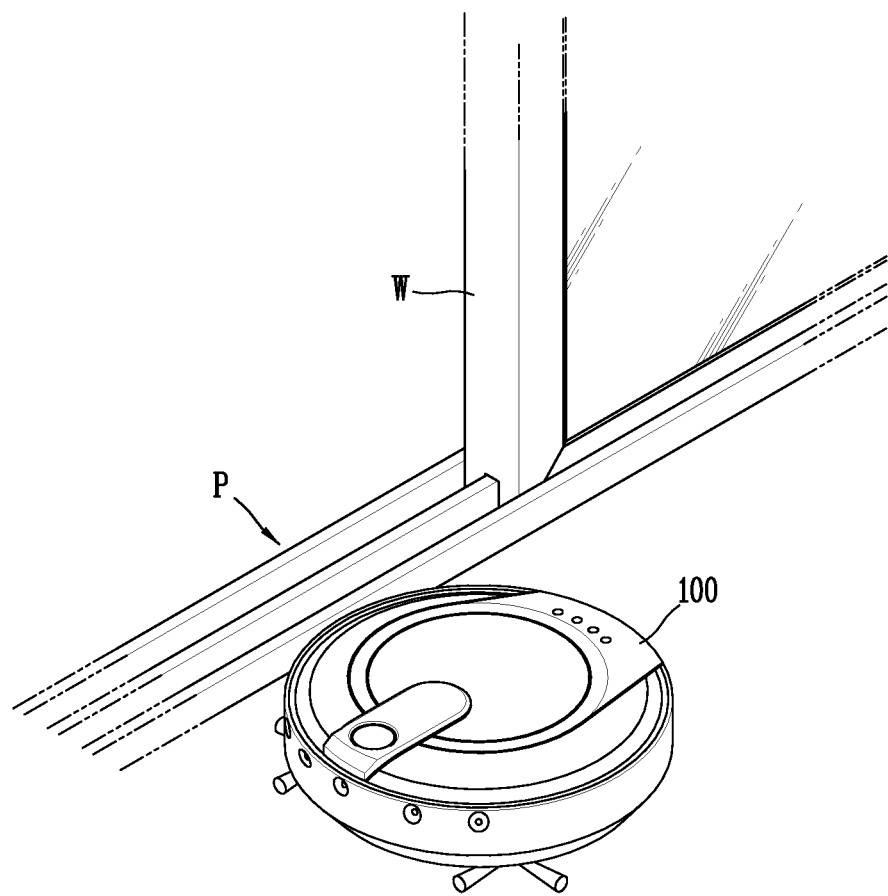
FIG. 9C is a view illustrating an example in which a pattern of FIG. 9A is positioned within a cleaning region.

As illustrated in FIG. 9C, when the recess F may be formed in an irregular portion formed in a door sill to which a window W is coupled.

Figure 10A:
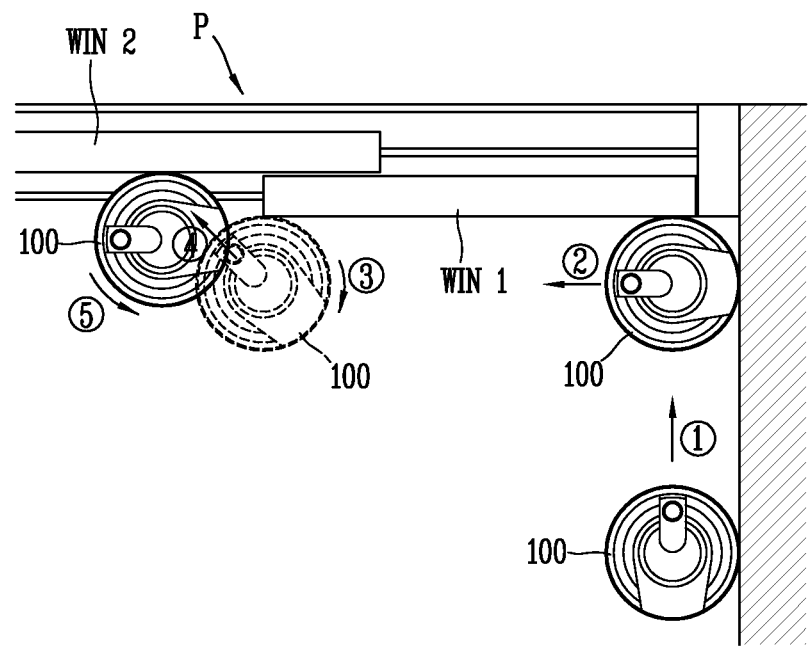
FIG. 10A is a view illustrating a process in which a related art robot cleaner is hindered by the pattern of FIG. 9A when the pattern is formed in a cleaning region.

FIG. 10A is a view illustrating a process in which a related art robot cleaner is hindered by the pattern of FIG. 9A when the pattern is formed in a cleaning region.

According to an exemplary embodiment of the present disclosure, as illustrated in FIG. 10A, the robot cleaner 100 may move in a ① direction along the wall to perform cleaning in a cleaning region. That is, the robot cleaner 100 may move along the wall, while maintaining a predetermined distance with respect to the wall sensed by the second obstacle sensors 181*a* and 181*b*.

When the robot cleaner 100 moves along the wall, the robot cleaner 100 may sense a first door sill WIN1 in front of the main body of the robot cleaner 100 through the second obstacle sensors 181*a* and 181*b* which are positioned on at least one surface thereof and sense an obstacle in front of the main body of the robot cleaner 100, and when the robot cleaner 100 senses the first door sill WIN1 in front of the main body of the robot cleaner 100, the robot cleaner 100 may move in a ② direction along the first door sill WIN1, while maintaining a predetermined distance from the first door sill WIN1 in front of the main body of the robot cleaner 100, to perform cleaning.

When the robot cleaner 100 moving in the ② direction reaches the end of the first door sill WIN1, the robot cleaner 100 may rotate in a ③ direction to travel an outer side of the first door sill WIN1 by the second obstacle sensors 181*a* and 181*b*.

According to an exemplary embodiment of the present disclosure, in a case in which the robot cleaner 100 performs avoidance traveling along the outer side of the obstacle, the robot cleaner 100 in the position of the corner of the obstacle may rotate by 45 degrees and travel in a ④ direction. Here, in general, since the diameter of the driving wheels (for example, the main wheels 131*a* and 131*b*) of the robot cleaner 100 is greater than the width W1 of the recess F, the driving wheels of the robot cleaner 100 are not hindered by the recess F.

However, when the robot cleaner 100 senses a second door sill WIN2 and rotates in a ⑤ direction in order to travel along the second door sill WIN2, the driving wheels of the robot cleaner 100 may fall to the preset pattern P forming the recess F formed to be parallel to the robot cleaner 100 so as to be hindered.

If the second door sill WIN2 is not present, the robot cleaner 100 may pass over the recess F formed in a length direction without sensing an obstacle in front of the main body of the robot cleaner 100, but when the second door sill WIN2 in front of the main body of the robot cleaner 100 is sensed by the second obstacle sensors 181*a* and 181*b*, the driving wheels of the robot cleaner 100 may be hindered to the preset pattern P as described above. Here, when the robot cleaner 100 passes over the recess F, since the diameter of the driving wheels (for example, the main wheels 131*a* and 131*b*) of the robot cleaner 100 is greater than the width W1 of the recess F, and thus, the driving wheels of the robot cleaner 100 are not hindered to the recess F.

In order to solve the problem, in the robot cleaner 100 according to an exemplary embodiment of the present disclosure, when a shape of the floor (or the surface to be cleaned) sensed by the first obstacle sensor 181c has a preset pattern and an obstacle in front of the main body of the robot cleaner 100 is sensed by the second obstacle sensors 181a and 181b, the control unit 110 may drive the driving wheels of the robot cleaner 100 to move backward in a second direction opposite to the first direction in which the robot cleaner 100 has entered the preset pattern, so as to move out of the preset pattern.

That is, in a case in which the main body of the robot cleaner 100 is positioned on the preset pattern and the control unit 110 senses an obstacle in front of the main body of the robot cleaner 100, driving of the driving wheels of the robot cleaner 100 may be limited such that the driving wheels are not hindered by the preset pattern.

Figure 10B:
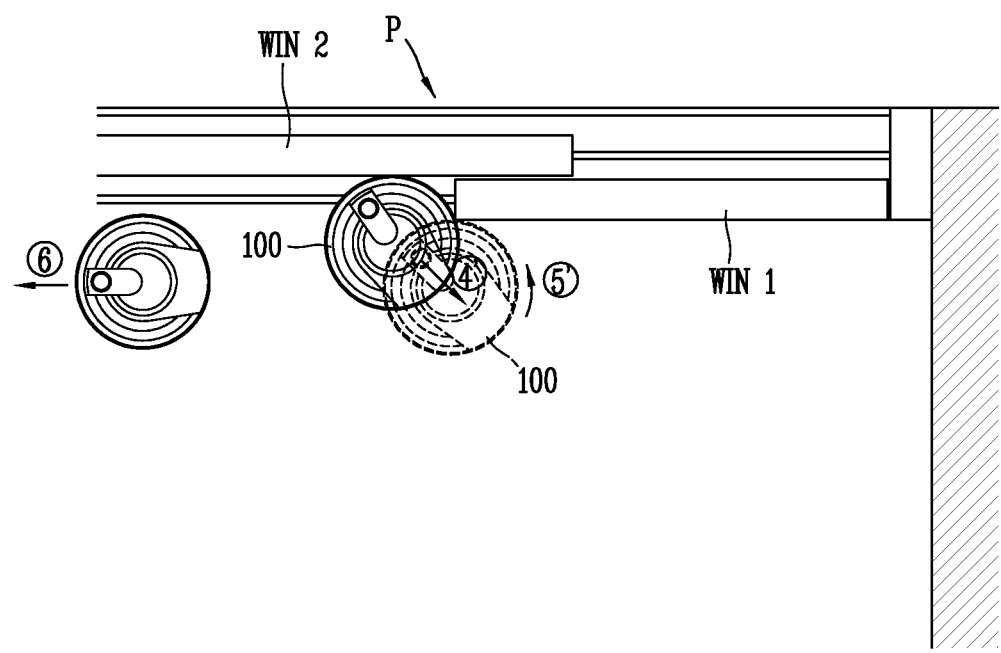
FIG. 10B is a view illustrating a process in which the robot cleaner according to an exemplary embodiment of the present disclosure moves when the pattern of FIG. 9A is formed in the cleaning region.

For example, as illustrated in FIG. 10A, when the robot cleaner 100 moves in the ② direction along the outer edge of the first door sill WIN1 as an obstacle, rotates in the ③ direction, and travels in the ④ direction, in a case in which the shape of the floor (or the surface to be cleaned) sensed by the first obstacle sensor 181c has the preset pattern P and the second door sill WIN2 as an obstacle in front of the main body of the robot cleaner 100 is sensed by the second obstacle sensors 181a and 181b, the robot cleaner 100 according to an exemplary embodiment of the present disclosure may move in a ④' direction opposite to the ④ direction in which the robot cleaner 100 has entered the preset pattern P, by a preset distance such that the driving wheels or the main body moves out of the preset pattern, rotate by 45 degrees to which the robot cleaner 100 has entered the preset pattern P, in the ⑤' direction opposite to the ⑤ direction, and thereafter, the robot cleaner 10 may run in a ⑥ direction to perform cleaning on the cleaning region according to a preset algorithm as illustrated in FIG. 10B.

Here, the angle at which the robot cleaner 100 has entered the preset pattern P may be an angle formed by the traveling direction of the robot cleaner 100 and a certain reference direction (for example, a length direction of the recess)

Meanwhile, when the robot cleaner 100 moves in the ② direction along the outer edge of the first door sill WIN1 as an obstacle, rotates in the ③ direction, travels in the ④ direction, rotates at a predetermined angle (for example, 45 degrees) in the same direction as the ③ direction again, and moves across the recess F formed in the length direction along the side of the first door sill WIN1, it may be determined that a shape of the floor (or the surface to be cleaned) sensed by the first obstacle sensor 181c is the preset pattern P and the second door sill WIN2 as an obstacle in front of the main body of the robot cleaner 100 is sensed by the second obstacle sensors 181a and 181b. In this case, the robot cleaner according to an exemplary embodiment of the present disclosure may move by a preset distance in a direction opposite to the direction in which the robot cleaner 100 has entered the preset pattern P such that the driving wheels or the main body moves out of the preset pattern P, rotates by 90 degrees as an angle at which the robot cleaner 100 has entered the preset pattern P in the ⑤' direction opposite to the ⑤ direction, and perform cleaning on the cleaning region according to a pre-set cleaning algorithm.

According to a specific exemplary embodiment, after the main body or the driving wheels of the robot cleaner 100 move out of the preset pattern, the robot cleaner 100 may perform cleaning, while moving in a ⑥ direction along the obstacle, while maintaining a predetermined distance from the second door sill WIN2 as an obstacle sensed by the second obstacle sensors 181a and 181b together with the preset pattern P.

Figure 10C:
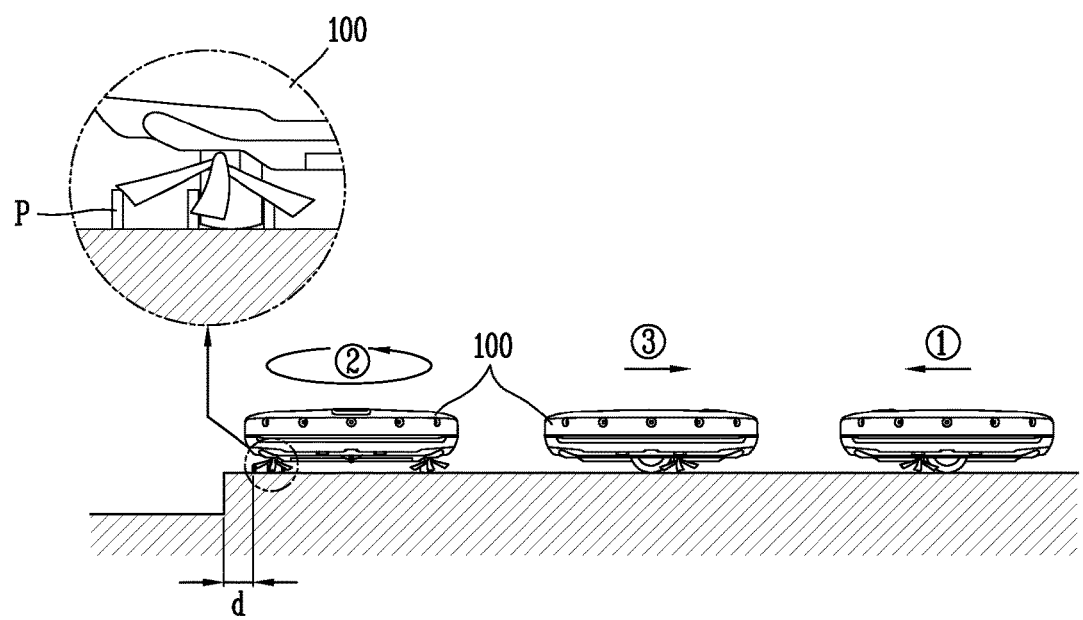
FIG. 10C is a view illustrating a process in which the robot cleaner according to an exemplary embodiment of the present disclosure moves when the pattern of FIG. 9A is formed in a position adjacent to a cliff.

FIG. 10C is a view illustrating a process in which the robot cleaner according to an exemplary embodiment of the present disclosure moves when the pattern of FIG. 9A is formed in a position adjacent to a cliff.

According to an exemplary embodiment, as illustrated in FIG. 10C, the robot cleaner 100 may sense a cliff present in front of the main body of the robot cleaner 100 by the first obstacle sensor 181c, while performing cleaning on the cleaning region. In this case, the robot cleaner 100 may perform avoidance traveling along the vicinity of the cliff sensed by the first obstacle sensor 181c.

The preset pattern P may be formed in a position spaced apart from the edge of the cliff by a predetermined distance d.

According to an exemplary embodiment, the robot cleaner 100 moves in the ① direction to perform cleaning on the cleaning region. In this case, when a cliff is sensed by the first obstacle sensor 181c, the robot cleaner 100 may rotate in the ② direction or in the opposite direction such that the robot cleaner 100 may not fall over the cliff.

When the robot cleaner 100 positioned to be spaced apart from the cliff by a predetermined distance rotates in the ② direction or in the opposite direction, the driving wheels of the robot cleaner 100 may fall to the recess (F) formed in the preset pattern P positioned to be adjacent to the cliff so as to be hindered.

In order to prevent this problem, when a shape of the floor (or the surface to be cleaned) sensed by the first obstacle sensor 181c has a preset pattern and the cliff in front of the main body of the robot cleaner 100 is sensed by the first obstacle sensor 181c, the robot cleaner 100 according to an exemplary embodiment of the present disclosure may move backward in the second direction opposite to the first direction in which the robot cleaner 100 has entered the preset pattern, such that the driving wheels or the main body can move out of the preset pattern.

That is, in a case in which the main body of the robot cleaner 100 is positioned on the preset pattern and a cliff in front of the main body of the robot cleaner 100 is sensed, driving of the driving wheels may be limited such that the driving wheels may not be hindered by the preset pattern.

For example, as illustrated in FIG. 10C, when the robot cleaner 100 performs cleaning on the cleaning region and travels in the ① direction, it may be determined that a shape of the floor (or the surface to be cleaned) sensed by the first obstacle sensor 181c is the preset pattern P, and when the cliff in front of the main body of the robot cleaner 100 is sensed by the first obstacle sensor 181c, as illustrated in FIG. 10C, the robot cleaner 100 according to an exemplary embodiment of the present disclosure may move in the ③ direction opposite to the ① direction in which the robot cleaner 100 has entered, by a preset distance, and when the driving wheels or the main body moves out of the preset pattern, the robot cleaner 100 may perform cleaning on the cleaning region according to a preset cleaning algorithm.

According to a specific exemplary embodiment, after the main body or the driving wheels of the robot cleaner 100 move out of the preset pattern, the robot cleaner 100 may move along the vicinity (or outer side) of the cliff to perform cleaning, while maintaining a predetermined distance from the cliff sensed by the first obstacle sensor 181c and the preset pattern P, or move along the outer side of the preset pattern to perform cleaning.

Figure 10D:
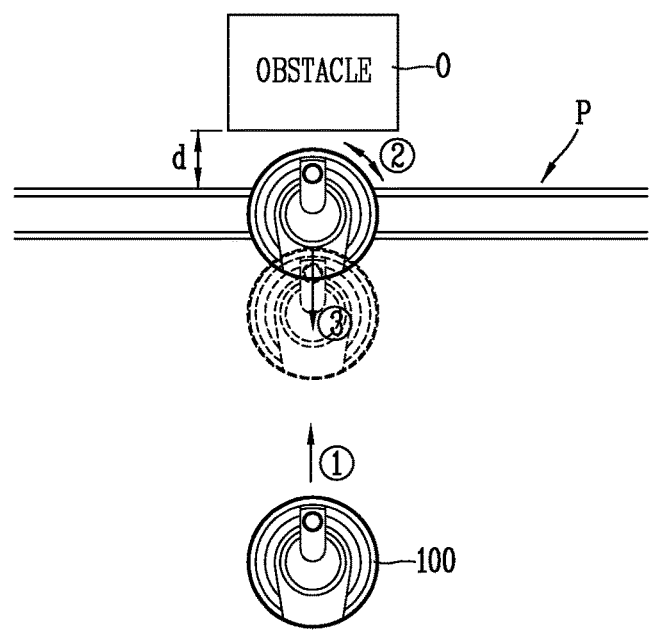
FIG. 10D is a view illustrating a process in which the robot cleaner according to an exemplary embodiment of the present disclosure moves when the pattern of FIG. 9A is formed in a position adjacent to an obstacle in a cleaning area.

Meanwhile, FIG. 10D is a view illustrating a process in which the robot cleaner 100 according to an exemplary embodiment of the present disclosure moves in a case in which the pattern of FIG. 9A is formed in a position adjacent to an obstacle within the cleaning region.

According to an exemplary embodiment, as illustrated in FIG. 10D, while the robot cleaner 100 is performing cleaning on the cleaning region, an obstacle O in front of the main body of the robot cleaner 100 may be sensed. Here, the robot cleaner 100 may perform avoidance traveling along the outer side of the obstacle O sensed by the first obstacle sensor 181c.

The preset pattern P may be formed to be spaced apart from the outer side of the obstacle O by a predetermined distance d.

According to an exemplary embodiment, the robot cleaner 100 moves in the ① direction to perform cleaning on the cleaning region, and when the obstacle O is sensed by the first obstacle sensor 181c, the robot cleaner 100 may perform cleaning on the vicinity of the obstacle O along an outer side of the obstacle O in order to perform cleaning on the cleaning region by avoiding the obstacle O.

However, when the robot cleaner 100 positioned to be spaced apart from the obstacle O by a predetermined distance rotates in the ② direction or in the opposite direction, the driving wheels of the robot cleaner 100 may fall to the recess F formed in the preset pattern P positioned to be adjacent to the obstacle O, so as to be hindered.

In order to solve the problem, in the robot cleaner 100 according to an exemplary embodiment of the present disclosure, when the shape of the floor (or the surface to be cleaned) sensed by the first obstacle sensor 181c is a preset pattern and the cliff in front of the main body of the robot cleaner 100 is sensed by the first obstacle sensor 181c, the robot cleaner 100 may move backward in the second direction opposite to the first direction in which the robot cleaner 100 has entered the preset pattern such that the driving wheels or the body moves out of the preset pattern P.

That is, when the main body of the robot cleaner 100 is positioned on the preset pattern and the obstacle O in front of the main body of the robot cleaner 100 is sensed, driving of the driving wheels may be limited so as not to be hindered by the preset pattern.

For example, as illustrated in FIG. 10D, the robot cleaner 100 performs cleaning on the cleaning region and travels in the ① direction. Here, when the shape of the floor (or the surface to be cleaned) sensed by the first obstacle sensor 181c is determined to be the preset pattern P and the obstacle O in front of the main body of the robot cleaner 100 is sensed by the first obstacle sensor 181c, as illustrated in FIG. 10D, the robot cleaner 100 according to an exemplary embodiment of the present disclosure moves in the ③ direction opposite to the ① direction in which the robot cleaner 100 has entered to the preset pattern P, such that the driving wheels or the main body moves out of the preset pattern P, and thereafter, the robot cleaner 100 may perform cleaning on the cleaning region according to a preset cleaning algorithm.

According to a specific exemplary embodiment, after the main body or the driving wheels of the robot cleaner 100 move out of the preset pattern P, the robot cleaner 100 may perform cleaning, while moving along the vicinity (or the outer side) of the obstacle O or while moving along the outer side of the preset pattern P, while maintaining a predetermined distance from the outer side of the obstacle O sensed by the first obstacle sensor 181c and the preset pattern P. In this case, as described above, if the robot cleaner 100 has sensed the preset pattern P by the first obstacle sensor 181c but fails to sense the obstacle O in front of the main body of the robot cleaner 100, the robot cleaner 100 may travel across the recess F formed in the length direction, and thus, the robot cleaner 100 may approach the obstacle O without the preset pattern P formed therein to clean an outer side of the obstacle O.

As described above, the robot cleaner 100 according to an exemplary embodiment of the present disclosure may move such that it is not hindered by the preset pattern P, but cleaning may not be performed on the preset pattern P. Thus, the robot cleaner 100 according to an exemplary embodiment of the present disclosure recognizes a position of the preset pattern P, a region on which cleaning was avoided not to be performed, indicates the recognized position of the present pattern P on a cleaning map, and outputs the corresponding position together with a cleaning map through the output unit 150, or transmit the position information of the preset pattern P to an external terminal device such that the external terminal device may output the position of the preset pattern P together with the cleaning map through the communication unit 160.

Here, the cleaning map refers to a map regarding a cleaning region. The cleaning map may include position information of various obstacles in the cleaning region, and the cleaning map may be stored in the storage unit 170, or the control unit 110 may generate a cleaning map through traveling regarding the cleaning region and store the same in the storage unit 170. In order to generate a cleaning map by the control unit 110, a known method may be used, and a detailed description thereof will be omitted.

In the case of the robot cleaner 100 according to an exemplary embodiment of the present disclosure, even when an irregular portion such as a recess or the like, is formed on the floor, the robot cleaner 100 can travel to perform cleaning without being hindered to the obstacle of the predetermined pattern.

Method for Controlling Robot Cleaner

Figure 11:
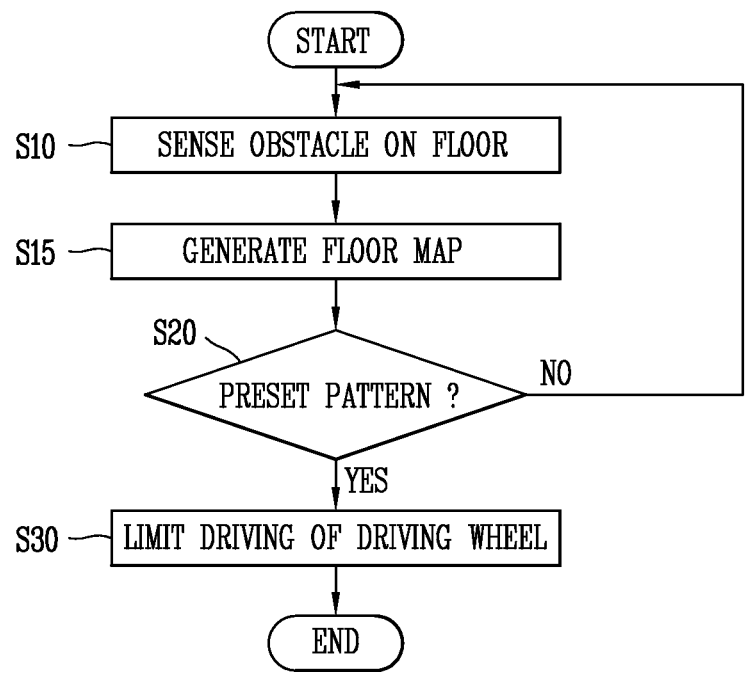
FIG. 11 is a flow chart illustrating a method for controlling a robot cleaner according to an exemplary embodiment of the present disclosure.

FIG. 11 is a flow chart illustrating a method for controlling a robot cleaner according to an exemplary embodiment of the present disclosure.

As illustrated in FIG. 11, a method for controlling a robot cleaner according to an exemplary embodiment of the present disclosure includes a step (S10) of sensing an obstacle on the floor, a step (S20) of determining whether the sensed obstacle on the floor has a preset pattern, and a step (S30) of limiting driving of the driving wheels such that the driving wheels may not be hindered by the pattern according to rotation of the main body according to driving of the driving wheels when the main body is present on the pattern.

Hereinafter, each component will be described in detail with reference to FIGS. 1 through 10D. Here, portions the same as those described above will be omitted.

In the step (S10) of sensing an obstacle on the floor, the robot cleaner 100 according to an exemplary embodiment of the present disclosure may recognize a shape of the floor (or the surface to be cleaned) by an obstacle sensed by the first obstacle sensor 181c through the control unit 110.

According to an exemplary embodiment of the present disclosure, in order to recognize a shape of the floor, as described above, the first obstacle sensor 181c may be used, or according to another exemplary embodiment, a shape of the floor may be recognized on the basis of image information obtained by using the lower camera sensor 181d, and a floor map may be generated on the basis of the image information as described hereinafter.

Meanwhile, as illustrated in FIG. 11, the method for controlling the robot cleaner according to an exemplary embodiment of the present disclosure may further include a step (S15) of generating a floor map on the basis of an obstacle of the floor sensed through the control unit 110.

For example, the floor map may be generated on the basis of information regarding a distance from the PSD sensor to the obstacle on the floor, and the floor map generated thusly may be a matrix in which terms having predetermined values are arranged in n columns and m rows.

In a case in which the PSD sensor includes two second sensors 1812c disposed on left and right sides of the rear surface of the main body of the robot cleaner 100 and the first sensor 1811c disposed between the two sensors 1812c, the map may have three columns corresponding to the number of the PSD sensors.

Also, the PSD sensors obtain information regarding an obstacle on the floor and separately store the information regarding an obstacle in the storage unit 170. The control unit 110 generates the m-row floor map having a size corresponding to the size of the rear surface of the robot cleaner 100.

Thereafter, the control unit 110 may determine whether the floor has a preset pattern by the sensed obstacle through traveling in step S20.

Here, as illustrated in FIG. 9A, the present pattern may be a pattern formed on the floor (the surface to be cleaned) and including at least one rising edge and at least one falling edge which alternate, and here, recesses may be formed spaced apart from one another by a predetermined interval between the any one falling edge and the any one rising edge.

As described above, as illustrated in FIG. 9B, the preset pattern may be a step including at least one rising edge or at least one falling edge.

In detail, as illustrated in FIG. 9A, the preset pattern P may be a pattern in which at least one rising edge Eu and at least one falling edge Ed alternate.

Here, any one protrusion B1 formed by the rising edge Eu and the other protrusion B2 adjacent to the one protrusion B1 may be spaced apart from one another on the floor of the cleaning region. That is, a recess F formed by the any one falling edge Ed and anyone rising edge Eu may have a predetermined width W1. Here, the width of the recess F may range from 10 mm to 50 mm.

Also, the recess F may have a predetermined height H, and in the preset pattern having a recess form, the rising edge and/or the falling edge may be equal to or greater than the preset depth. Here, the height H of the preset pattern may be 15 mm or greater.

That is, at least one recess F having the predetermined width W1 and the predetermined height H may be formed in the preset pattern.

As illustrated in FIG. 9A, in a case in which at least one driving wheel (for example, the main wheels 131a and 131b) is inserted into the recess F formed to be greater than the predetermined width W1 and the predetermined height H when the robot cleaner 100 is driving, rotation or movement of the robot cleaner 100 may be limited.

That is, the predetermined width W1 may be greater than a width W4 of the main wheels 131a and 131b (in other words, a thickness of the main wheels 131a and 131b) and may be smaller than a width in which the main wheels 131a and 131b are rotatable, and thus, the main wheels of the robot cleaner 100 may be limited in rotation in a horizontal direction.

Also, the predetermined height H of the recess F may be higher than a height to which the main wheels 131a and 131b protrude from the main body of the robot cleaner 100, and thus, the main wheels of the robot cleaner 100 may be limited in rotation with respect to a driving axis, limiting movement of the robot cleaner 100.

Meanwhile, the recess F may be repeatedly formed within a preset distance W2. That is, a plurality of recesses F may be formed within a distance W2 narrower than the width Wr of the main wheels 131a and 131b of the robot cleaner 100.

In a case in which the main wheels 131a and 131b of the robot cleaner 100 are positioned on the floor including the recess F, when the distance W2 between the plurality of recesses F is narrower than the width W4 of the main wheels 131a and 131b, the main wheels 131a and 131b of the robot cleaner 100 are highly likely to be hindered to the recess F when the robot cleaner 100 rotates and/or moves. In this case, the distance W2 between the plurality of recesses F having a preset pattern determined by the control unit 110 may be equal to or smaller than 50 mm.

As described above, the preset pattern may include a shape in which a plurality of steps are repeated at certain distances, and the step illustrated in FIG. 9B is no different.

Thus, the method for controlling a robot cleaner according to an exemplary embodiment of the present disclosure includes a step (S30) of driving of the driving wheels such that the driving wheels are not hindered by the pattern according to rotation of the main body according to driving of the driving wheels, when the main body of the robot cleaner 100 is positioned on the pattern.

Figure 12:
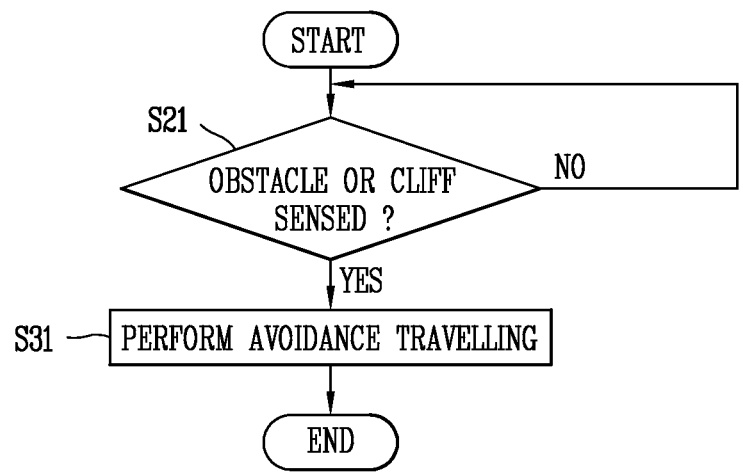
FIG. 12 is a flow chart illustrating a control method when a general robot cleaner detects an obstacle or a cliff present in front of the main body of the robot cleaner.

As illustrated in FIG. 12, a general robot cleaner may sense an obstacle in front of the main body of the robot cleaner 100 by means of the second obstacle sensors 181a and 181b through the control unit 110 or sense a cliff in front of the main body of the robot cleaner 100 by the first obstacle sensor 181c in step S21. Thereafter, when the robot cleaner 100 senses an obstacle or a cliff in front of the main body of the robot cleaner 100 in step S21, the control unit 110 may control the driving wheels (for example, the main wheels 131a and 131b) such that the robot cleaner 100 may perform avoidance traveling along the outer side of the obstacle or along the vicinity of the cliff in step S31.

Figure 13:
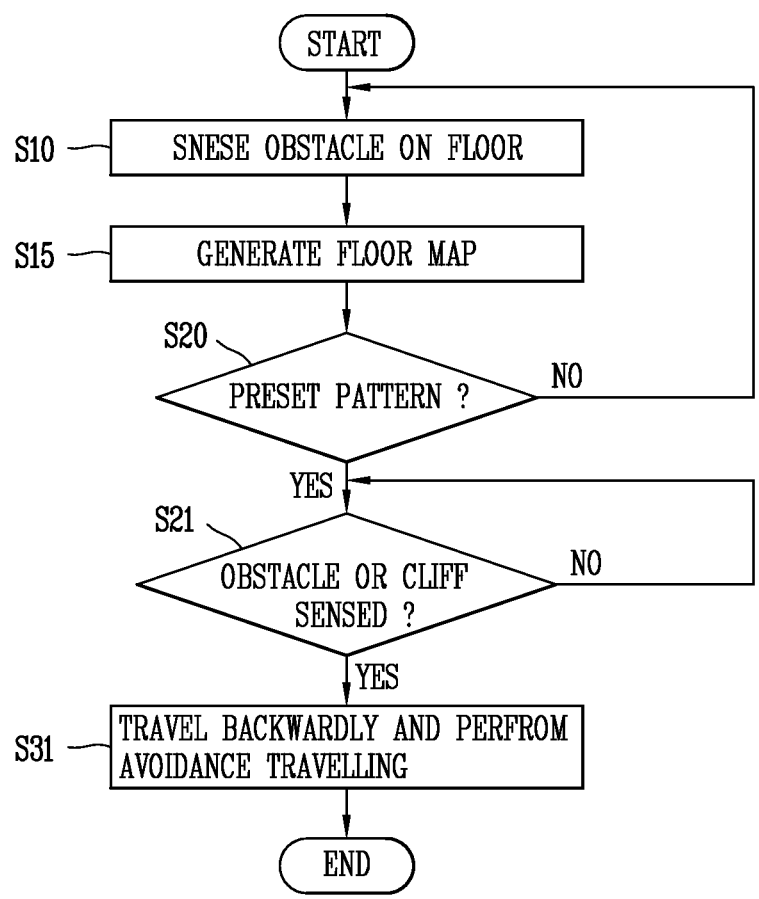
FIG. 13 is a flow chart illustrating a method for controlling a robot cleaner according to another exemplary embodiment of the present disclosure.

FIG. 13 is a flow chart illustrating a method for controlling a robot cleaner according to another exemplary embodiment of the present disclosure.

As illustrated in FIG. 13, according to an exemplary embodiment of the present disclosure, while the robot cleaner 100 is traveling in the first direction, when the main body of the robot cleaner 100 is positioned on the preset pattern, the control unit 110 may sense an obstacle or a cliff in front of the main body of the robot cleaner 100 by using the first obstacle sensor 181c in step S21.

In this case, when an obstacle or a cliff is sensed, the control unit 110 may drive the driving wheels to travel in the second direction opposite to the first direction to allow the robot cleaner 100 to move backwardly in step S31.

Thereafter, the robot cleaner 100 travels in the second direction so as to move backwardly from the preset pattern, and then, when the main body of the robot cleaner 100 moves out of the preset pattern, the driving wheels may be driven to perform avoidance traveling along an outer side of the obstacle or the cliff or the outer side of the preset pattern in step S31.

The contents described above with reference to FIGS. 10A through 10D will replace detailed descriptions thereof, and redundant descriptions thereof will be omitted.

As described above, the robot cleaner 100 according to another exemplary embodiment of the present disclosure may move such that the robot cleaner 100 is not hindered by the preset pattern P. In this case, however, cleaning may not be performed on the preset pattern P. Thus, the robot cleaner 100 according to another exemplary embodiment of the present disclosure may further include a step (not shown) of recognizing a position of the preset pattern P, a region in which cleaning has not been performed due to avoidance traveling and a step (not shown) of indicating the position of the preset pattern P on a cleaning map and outputting the corresponding position together with the cleaning map through the output unit 150.

The robot cleaner 100 according to another exemplary embodiment of the present disclosure may further include a step (not shown) of transmitting position information of the preset pattern P to the external terminal device through the communication unit 160, after the step of recognizing the position of the preset pattern P, and a step (not shown) of outputting the position of the preset pattern P together with the cleaning map by the external terminal device.

According to the method for controlling a robot cleaner according to an exemplary embodiment of the present disclosure, even though an irregular portion such as a recess, or the like, is formed on the floor, the robot cleaner can travel to perform cleaning, without being hindered to the obstacle having a predetermined pattern.

Computer-Readable Recording Medium

The method for controlling a robot cleaner according to an embodiment of the present disclosure described above may be implemented as computer commands which can be executed through various computer components and recorded in a computer-readable recording medium. The computer-readable recording medium may include program instructions, data files, data structures or a combination thereof. Program instructions recorded on the computer-readable recording medium may be particularly designed and structured for the present invention or available to those skilled in computer software. Examples of the computer-readable recording medium include hardware devices particularly configured to store and perform program instructions, such as magnetic mediums, such as a hard disk, a floppy disk, and a magnetic tape; optical mediums, such as a compact disk-read only memory (CD-ROM) and a digital versatile disc (DVD); magneto-optical mediums, such as floptical disks; a read-only memory (ROM); a random access memory (RAM); and a flash memory. The program instructions may include, for example, a high-level language code that can be executed by a computer using an interpreter, as well as a machine language code made by a complier. The hardware device described herein may be configured to be operated by one or more software modules to perform processing according to the present invention, and vice versa.

The exemplary embodiments of the present invention will now be described with reference to the accompanying drawings, in which like numbers refer to like elements throughout. In describing the present invention, if a detailed explanation for a related known function or construction is considered to unnecessarily divert the gist of the present invention, such explanation has been omitted but would be understood by those skilled in the art. The accompanying drawings of the present invention aim to facilitate understanding of the present invention and should not be construed as limited to the accompanying drawings. The technical idea of the present invention should be interpreted to embrace all such alterations, modifications, and variations in addition to the accompanying drawings.

The invention claimed is:

1. A robot cleaner comprising:
a main body forming an appearance;
a driving wheel installed on a lower portion of the main body;
a driving motor configured to drive the driving wheel;
a first obstacle sensor positioned on the lower portion of the main body and configured to sense an obstacle on a floor; and
a controller configured to, when a contour of the sensed obstacle on the floor has a prescribed pattern, modify driving of the driving wheel by the driving motor,
wherein the prescribed pattern includes at least one of a rising edge or a falling edge, and
wherein the prescribed pattern includes a recess form in which the rising edge and the falling edge have at least a prescribed depth, and a width between the rising edge and the falling edge is within a prescribed range, or the prescribed pattern includes a step form including one of the rising edge or the falling edge.

2. The robot cleaner of claim 1, further comprising:
a memory configured to store a floor map identifying distances between the lower portion and sections of the floor, each of the sections having a size corresponding to a size of a region of the lower portion wherein the first obstacle sensor is positioned,
wherein the controller generates the floor map based on readings by the first obstacle sensor, and stores the generated floor map in the memory.

3. The robot cleaner of claim 1, wherein the prescribed pattern includes a form in which a plurality of recesses are repeated within a prescribed distance, or a form in which a plurality of steps are repeated at a certain distance interval.

4. The robot cleaner of claim 1, further comprising:
a second obstacle sensor positioned on at least one of a side or a top of the main body to sense another obstacle in front of the main body.

5. The robot cleaner of claim 4, wherein when the robot cleaner is traveling in a first direction, is positioned on the obstacle on the floor, and either the obstacle in front of the main body is sensed by the second obstacle sensor or if a cliff in front of the main body is sensed by the first obstacle sensor, the controller modifies the driving of the driving wheel by the driving motor such that the robot cleaner stops travelling in the first direction and travels in a second direction opposite to the first direction.

6. The robot cleaner of claim 5, wherein, after the robot cleaner travels in the second direction and the driving wheel is positioned off the obstacle on the floor, the controller further modifies the driving of the driving wheel by the driving motor such that the driving wheel travels along an outer edge of the obstacle on the floor.

7. A method for controlling a robot cleaner, the method comprising:
sensing, by a sensor positioned on a lower portion of a main body of the robot cleaner, an obstacle on a floor;
determining whether a contour of the obstacle on the floor corresponds to a prescribed pattern; and
when the contour of the sensed obstacle on the floor corresponds to the prescribed pattern and a portion of the main body of the robot cleaner is positioned on the obstacle, modifying driving of a driving wheel included in the robot cleaner,
wherein the prescribed pattern includes a recess form in which a rising edge and a falling edge have at least a prescribed depth, and a width between the rising edge and the falling edge is within a prescribed range, or the prescribed pattern includes a step form including one of the rising edge or the falling edge.

8. The method of claim 7, further comprising:
generating a floor map identifying distances between sections of the floor and the lower portion of the main body;
detecting the obstacle on the floor based on the floor map.

9. The method of claim 8, wherein the sections of the floor within the floor map have a size corresponding to a size of a region of the lower portion of the robot cleaner where the sensor is positioned.

10. The method of claim 7, wherein the present pattern includes a form in which a plurality of recesses are repeated within a prescribed distance, or a form in which a plurality of steps are repeated at a certain distance interval.

11. The method of claim 7, further comprising:
sensing another obstacle or a cliff in front of the main body; and
when the other obstacle or the cliff is sensed, modifying the driving of the driving wheel to cause the driving wheel to move along an outer edge of the other obstacle or the cliff.

12. The method of claim 7, further comprising:
when the robot cleaner is traveling in a first direction and a portion of the main body is positioned over the obstacle on the floor, sensing another obstacle or a cliff in front of the main body; and
when the other obstacle or the cliff is sensed, modifying the driving of the driving wheel cause the robot cleaner to travel in a second direction opposite to the first direction.

13. The method of claim 12, further comprising:
modifying the driving of the driving wheel to cause the robot cleaner to travel along an outer edge of the obstacle on the floor, after the robot cleaner travels in the second direction and a portion of the main body moves off of obstacle on the floor.

14. The robot cleaner of claim 1, wherein the first obstacle sensor includes at least one of an infrared sensor, an ultrasonic sensor, a radio frequency (RF) signal sensor, or a position sensitive detector (PSD) sensor.

15. The robot cleaner of claim 1, wherein the first obstacle sensor includes a first sensor positioned on a front region of the lower portion and a second sensor positioned on another region of the lower portion between the first sensor and the driving wheel.

16. The robot cleaner of claim 1, further comprising a camera sensor positioned on the lower portion of the main body, the camera sensor detecting a movement of the robot cleaner based on captured image data of the floor.

17. The robot cleaner of claim 4, wherein the second obstacle sensor includes at least one of an infrared sensor, an ultrasonic sensor, radio frequency (RF) signal sensor, or a geomagnetic sensor.

* * * * *